(12) United States Patent
Obkircher et al.

(10) Patent No.: US 8,496,670 B2
(45) Date of Patent: Jul. 30, 2013

(54) TILTING PREVENTION FOR DEPILATING DEVICES

(75) Inventors: Christoph Kurt Obkircher, Klagenfurt (AT); Harald Duller, Klagenfurt (AT); Christina Dorothea Tittas, Wachtersbach (DE)

(73) Assignee: Koninklijke Philips N.V., Eindhoven (NL)

( * ) Notice: Subject to any disclaimer, the term of this patent is extended or adjusted under 35 U.S.C. 154(b) by 121 days.

(21) Appl. No.: 13/060,073

(22) PCT Filed: Aug. 26, 2009

(86) PCT No.: PCT/IB2009/053737
§ 371 (c)(1),
(2), (4) Date: Feb. 22, 2011

(87) PCT Pub. No.: WO2010/023629
PCT Pub. Date: Mar. 4, 2010

(65) Prior Publication Data
US 2011/0152884 A1    Jun. 23, 2011

(30) Foreign Application Priority Data
Sep. 1, 2008  (EP) ................................. 08163353

(51) Int. Cl.
*A61B 17/50* (2006.01)
(52) U.S. Cl.
USPC ....................................................... 606/133

(58) Field of Classification Search
USPC .................. 606/133, 131, 9; 30/32, 34.05, 43, 30/43.1, 43.3, 43.7, 44, 42, 45, 41.7, 41.8
See application file for complete search history.

(56) References Cited

U.S. PATENT DOCUMENTS

| 4,380,869 | A | * | 4/1983 | Shirakawa et al. | 30/34.1 |
| 4,982,725 | A | * | 1/1991 | Hibino et al. | 600/117 |
| 6,306,148 | B1 | * | 10/2001 | Knesch et al. | 606/133 |

FOREIGN PATENT DOCUMENTS

| DE | 19932884 C1 | 8/2000 |
| EP | 0281017 B1 | 9/1992 |

* cited by examiner

*Primary Examiner* — Kathleen Holwerda
*Assistant Examiner* — Jocelin Tanner

(57) ABSTRACT

A depilating device (14) for depilating hair (12) from a surface (10) of a skin (11) comprises a housing (16) and a depilating member (18) arranged in said housing. In operation, said depilating member has an effective depilating action when positioned within a predetermined range of angular positions (5) relative to the surface of the skin. The depilating device further comprises a detector for detecting an actual angular position (28) of the depilating member relative to the surface of the skin, and feedback means cooperating with said detector for providing a feedback signal when said actual angular position exceeds said predetermined range of angular positions. According to a specific embodiment, the detector comprises a skin contact member (34) arranged adjacent to the depilating member (18) and being pivotable relative to the housing (16) about a pivot axis (54) extending parallel to a skin contact surface of the depilating member.

12 Claims, 23 Drawing Sheets

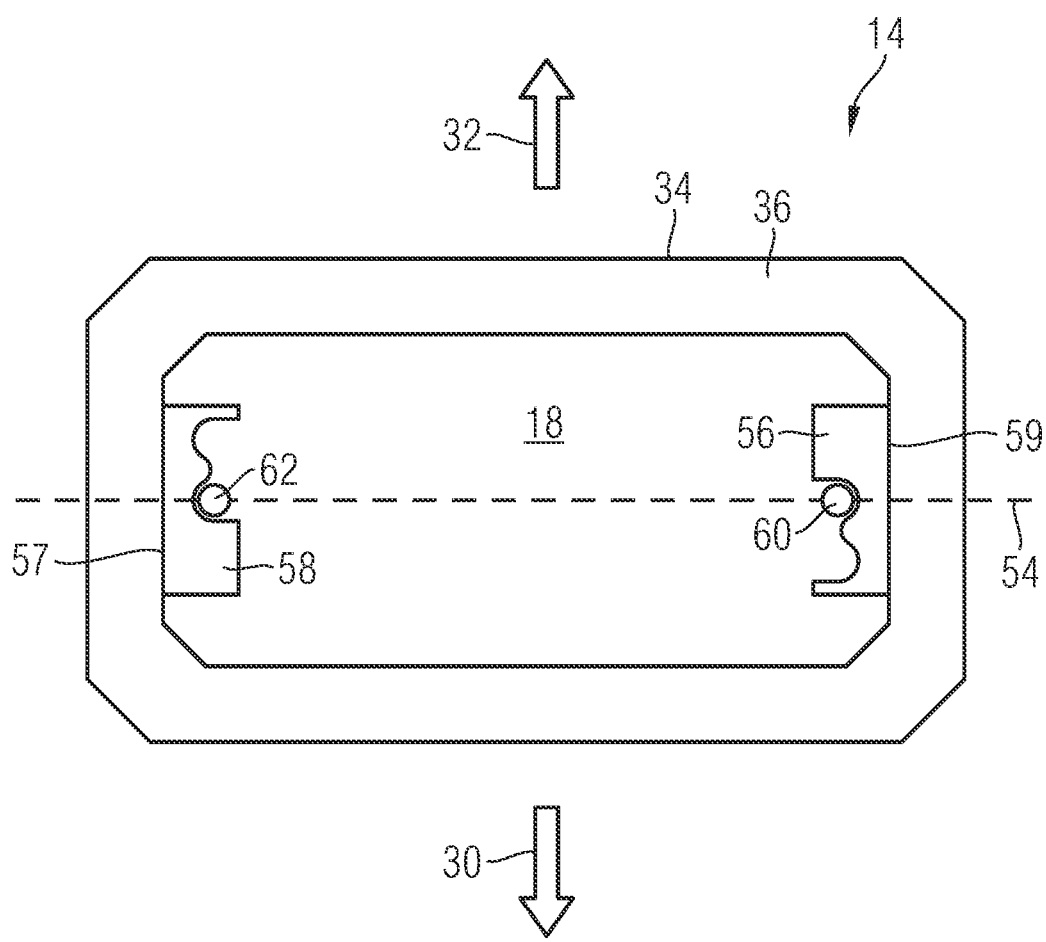

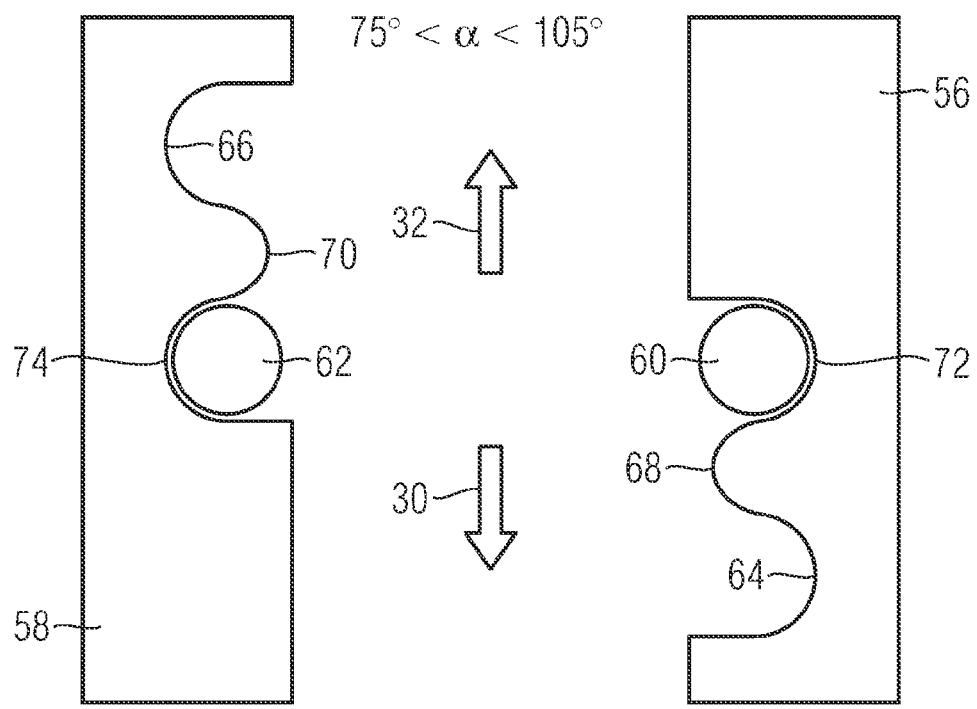
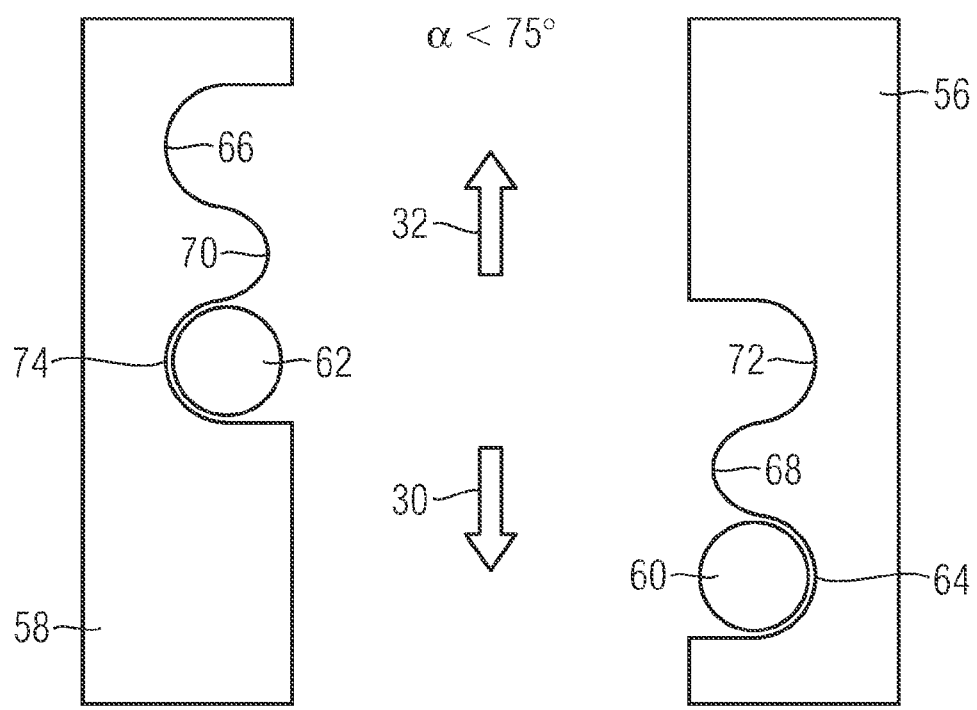

α = 75°

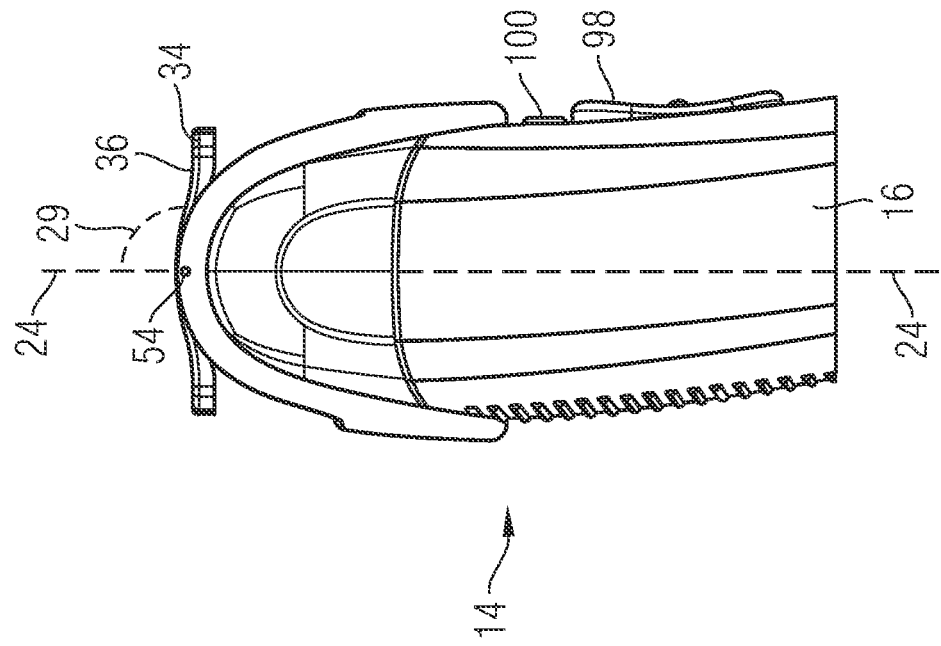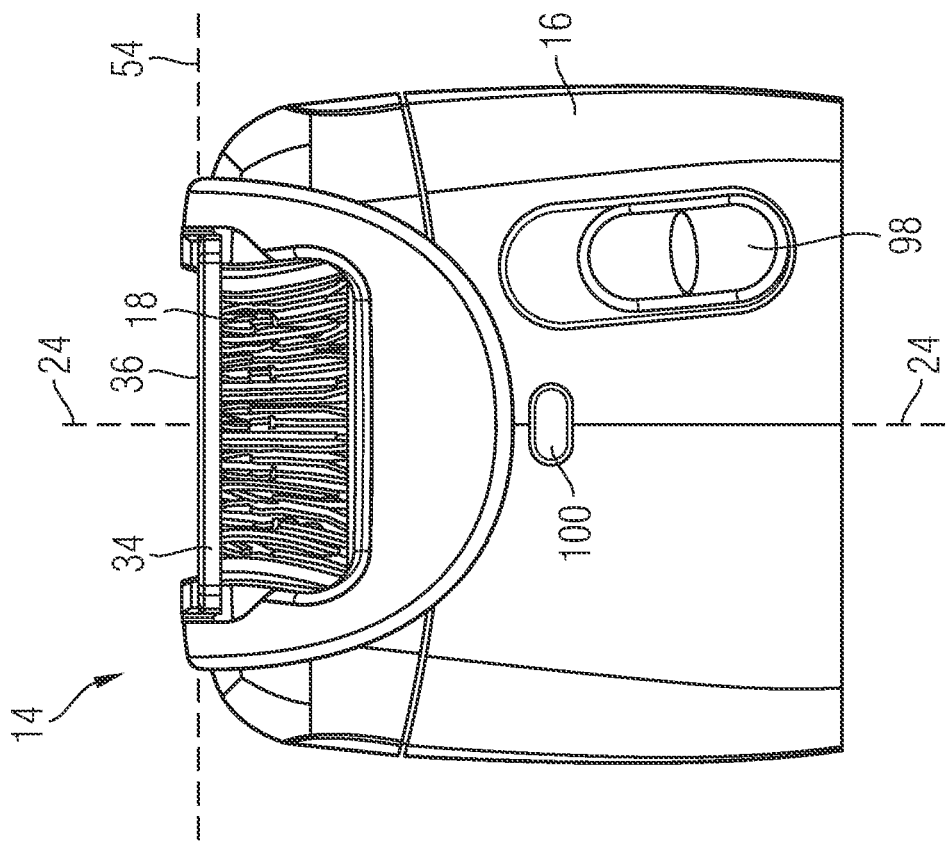

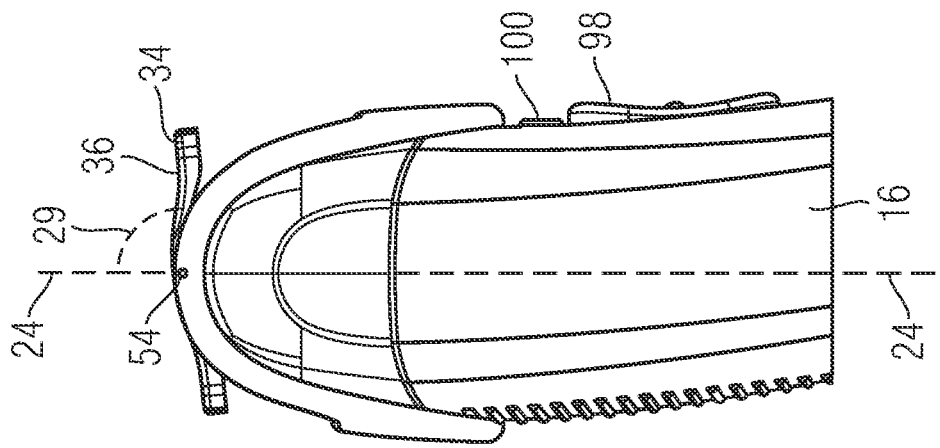
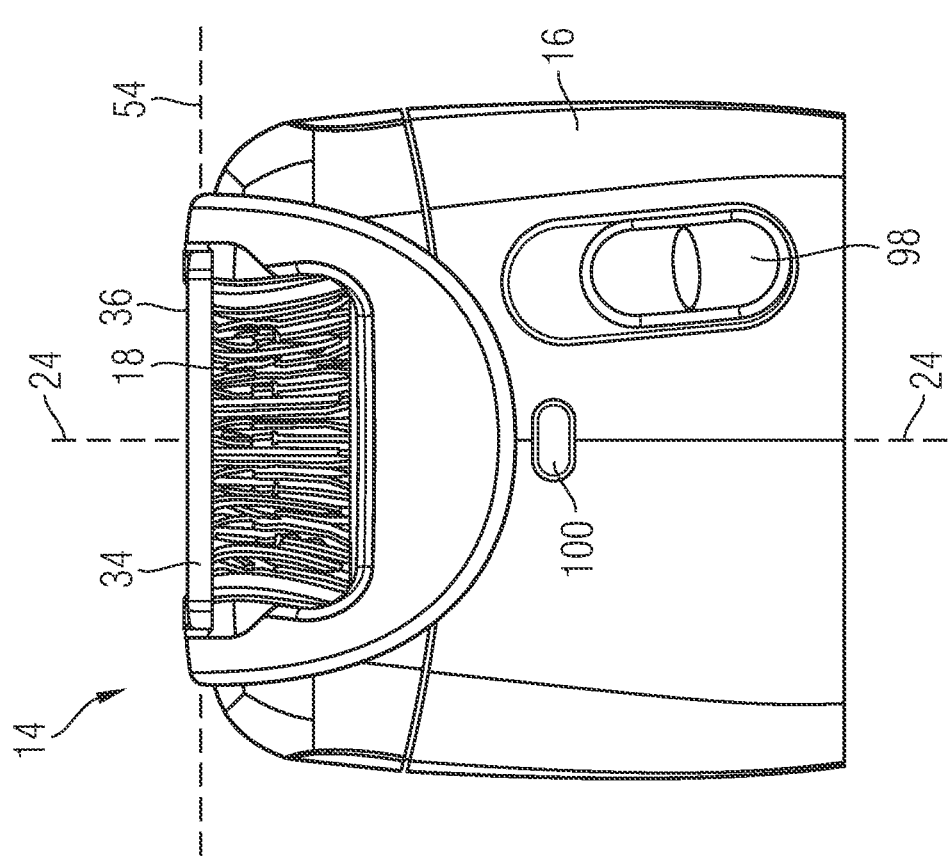

TILTING PREVENTION FOR DEPILATING DEVICES

FIELD OF THE INVENTION

The invention relates to a depilating device for depilating hair from a surface of a skin, comprising a housing and a depilating member arranged in said housing, wherein, in operation, said depilating member has an effective depilating action when positioned within a predetermined range of angular positions relative to the surface of the skin.

BACKGROUND OF THE INVENTION

Depilating devices such as epilators, shavers, and hair clippers must often be placed in a certain angular position on the surface of the skin in order to obtain an optimal result. More specifically, the application angle, defined as the angle between a reference axis (longitudinal axis) of the depilating device and the surface of the skin, should lie within a certain optimal range. For disc-type epilators with closing tweezers, for example, the optimal application angle is about 90° plus/minus 15°. A depilating device typically comprises a depilating member for extracting or cutting hairs, and a body comprising a motor and providing a grip for holding the device. The depilating member comprises, for example, tweezers or cutting blades. The inclination of the depilating member relative to the surface of the skin is generally determined by the inclination of the body relative to the surface of the skin. In order to achieve an effective depilating action, the depilating member has to come into contact with the hair and/or the skin surface in a position which lies within a predetermined range of angular positions relative to the surface of the skin. If the depilating device is applied to the skin at an angular position which exceeds substantially from said predetermined range of angular positions, the depilating action may be insufficient. Furthermore the treatment may cause injuries, skin irritations, pain, or broken hairs resulting in ingrowing hair. This can pose problems to inexperienced users who have difficulties in positioning the depilating device at the optimal application angle relative to the skin. It is therefore an object of the invention to provide a depilating device having means for increasing the probability that the depilating device is being held at an optimal application angle relative to the surface of the skin.

This object is achieved by the features of the independent claim. Further specifications and preferred embodiments of the invention are outlined in the dependent claims.

SUMMARY OF THE INVENTION

According to the invention, the depilating device further comprises a detector for detecting an actual angular position (application angle) of the depilating member relative to the surface of the skin, and feedback means cooperating with said detector for providing a feedback signal when said actual angular position exceeds said predetermined range of angular positions. Thus the depilating device is capable of delivering a feedback signal to the user when the application angle passes from a predefined first range and to an adjoining predefined second range. The first range may be optimal in the sense that the depilating device has a characteristic which is a function of the application angle and which is optimal for an optimal application angle, the optimal application angle being in the first range. The characteristic may for example be one of the following characteristics: depilation efficiency, depilation quality, percentage of remaining hairs after a single passing of the depilating member over the skin, average length of cut hairs, uniformness of the length of the hair after cutting, noise, collection of removed hairs inside the depilating device, wearing-down of the depilating member, and skin irritation. The characteristic which defines the optimum application angle may also be a combination of two or more of the above-mentioned characteristics, in which case the optimum application angle may be a compromise. The second range may be suboptimal in the sense that the characteristic is not optimal for any application angle in the second range. In this case depilation may however still be possible at least for a subrange of the suboptimal second range. The first range may, for example, comprise the range of 75° to 105°, an application angle of 90° corresponding to the case in which the depilating device is held perpendicular relative to the surface of the skin. The second range may then, for example, comprise all angles larger than 105°. The term "range" as used herein is synonymous with the mathematical term "interval". Generating a feedback signal as a function of the variation of the application angle allows alerting the user as soon as the application angle exceeds the predetermined range of angular positions. According to a preferred embodiment, the longitudinal axis of the depilating device is pivotable relative to the skin only about an axis which is oriented parallel to the skin and perpendicular to a moving direction of the depilating device. Indeed most existing types of depilating devices are designed for being moved on the skin in a moving direction defined by the orientation of the depilating member, and for being tilted about an axis parallel to the skin and perpendicular to the moving direction. In most depilating devices the direction opposite the moving direction is also an allowed moving direction. The depilating device then has at least two opposite moving directions. The longitudinal axis may be fixed relative to a body for holding the depilating device. Alternatively the longitudinal axis may be fixed relative to the depilating member. According to a specific embodiment, the feedback mechanism generates a feedback signal also when the application angle passes from the first range to a third range while the depilating member is applied to the skin, the first range lying between the second range and the third range. Herein the third range is defined analogously to the second range. The first range, the second range, and the third range may, for example, be the following ranges: 75° to 105°, less than 75°, and larger than 105°, respectively. Of course, the most suitable division of the total allowed range of application angles into a first, second, and third range may depend strongly on the specific type of depilating device. The depilating device may be such that it is in a first state when the application angle is in the first range and in a second state when the application angle is in the second range. Thus the feedback signal may be generated by the depilating device passing from the first state to the second state. Each state may be characterized by a certain mechanical state and/or, in the case where the depilating device includes an electronic control unit, a logical state. In this context, the second state may be energetically higher than the first state. Thus, in order to tilt the depilating device out of the first range, the user needs to supply energy to the depilating device, for example by overcoming a mechanical load inside the depilating device. This mechanical effort will be experienced by the user as a tactile feedback signal. If the second state is energetically higher than the first state, the second state may be metastable. That is, it has a finite "lifetime", so that if no external force is exerted on the depilating device, the device will automatically return from its metastable second state to its energetically lower first state after a certain delay. The depilating device may be arranged such that a feedback signal is provided as long as the application angle lies in the second range. Thus the user may be informed on tilting the depilating device in a suboptimal manner not only at the moment at which the device is being tilted out of the first range, but as long as the application angle is outside the first range. Alternatively a feedback signal may be provided only each time the application angle crosses the border between the first range and the second range. Thereby a possible irritation of the user is avoided, especially when the user has deliberately decided to apply the depilating device at an application angle outside the first range, e.g. when treating parts of the skin at which applying the depilating device at an optimal application angle is more difficult, such as in armpits.

The depilating member may comprise clamping members which are rotatable relative to the housing about a rotational axis, wherein said predetermined range is associated with an angular effective operating zone of said clamping members relative to said rotational axis. The clamping members are typically but not necessarily disc-shaped. The angular effective operating zone is typically the stationary (non-rotating) zone where adjacent clamping members cooperate in a tweezer-like manner for gripping and extracting hairs from the skin.

The detector may comprise a skin contact member arranged adjacent to the depilating member and being pivotable relative to the housing about a pivot axis extending parallel to a skin contact surface of the depilating member. When the depilating device is applied to the skin in a prescribed manner such that a skin contact surface of the skin contact member contacts the skin, the application angle is thus translated into an internal angle of the depilating device, namely, into a pivot angle of the pivotable skin contact relative to the housing. According to a particular embodiment, the application angle and the pivot angle coincide as long as the application angle is in the first range or in the adjoining second range. Thus the orientation of the skin contact member relative to the skin remains unchanged when the application angle passes from the first range to the second range. Thus the skin contact member may remain in firm contact with the skin for both the first range and the second range of the application angle, thereby further increasing the stability of the position and/or orientation of the depilating device relative to the skin. In particular, it is avoided that the skin contact member lifts off from the skin when the application angle passes from the first range to the second range. It is only when the application angle leaves the second range and enters a non-working range that the skin contact member will be tilted over its edge, in which case the application angle and the pivot angle will no longer coincide.

The pivot axis of the skin contact member may extend parallel to the rotational axis of the clamping members.

The skin contact member may be spring-biased to a rest position in which a pivot angle of the skin contact member relative to the skin contact surface is 90°. Thereby the user of the depilating device is encouraged to hold the device at a right application angle relative to the skin.

The feedback means may be adapted to provide at least one of the following feedback signals to the user: a tactile feedback signal, an acoustic feedback signal, and an optical feedback signal. A tactile feedback signal involves a mechanical stimulus on the skin of the user or any other effect experienced by the skin, by the device-holding hand or by other sensitive body regions of the user. An acoustic feedback signal involves the emission of audible sound. An optical feedback signal involves the emission of visible light.

For providing an acoustic feedback signal the feedback means may comprise an elastic member arranged such that it is elastically deformed when the skin contact member is pivoted. The elastic member may, for example, be a spring, in particular a metal leaf spring.

The elastic member may notably be arranged so as to be able to assume a stable or metastable first shape and a stable or metastable second shape, wherein the shape of the elastic member changes from the first shape to the second shape under production of a clicking sound. Such an arrangement may be familiar from metal toy clickers (so-called frog clickers). The toy clicker arrangement typically comprises a metal leaf that produces a click sound when it bends (or is forced to bend) from a first stable or metastable shape to a second stable or metastable shape.

According to a specific embodiment, the feedback means comprise a spring and a carrier coupled to the skin contact member, the carrier comprising a first bearing and a second bearing such that when said actual angular position is in said predetermined range of angular positions the spring engages with the first bearing and when said actual angular position exceeds said predetermined range of angular positions the spring engages with the second bearing. This mechanism ensures that, depending on the actual angular position, the spring assumes either a first or a second position, shape, or orientation. Thus the feedback signal is associated with the spring disengaging from the first bearing and engaging with the second bearing. The first bearing may for example be provided by a first notch in the carrier, and the second bearing may be provided by a second notch in the carrier.

In this context, the feedback means may be designed such that the spring automatically returns from the second bearing to the first bearing if no external force is exerted on the depilating device. Thus, if the depilating device is taken off the skin while the application angle is in the second range, the skin contact member will automatically pivot relative to the housing of the depilating device such that the pivot angle returns from the second range to the first range. The spring may automatically return from the second bearing to the first bearing either immediately or after a delay.

The feedback means may also be such that when the actual angular position is in the predetermined range of angular positions the skin contact member does not couple to the depilating member or a driving member thereof, whereas when the actual angular position exceeds the predetermined range of angular positions the skin contact member couples to the depilating member or the driving member. Hence, when the actual angular position exceeds the predetermined range of angular positions, the skin contact member is vibrated or otherwise moved by the depilating member or by its driving member, thereby providing a tactile and/or acoustic feedback signal. In particular, a rattling sound may be produced.

The skin contact member may comprise a coupling member for contacting the depilating member or the driving member when the actual angular position exceeds the predetermined range of angular positions. The coupling member may form a single piece with the skin contact member. The coupling member contacting the depilating member or the driving member may produce vibrations of the skin contact member and/or noise, thus providing a tactile and/or acoustic feedback signal.

The detector may comprise circuitry for emitting sound and/or light and/or triggering a tactile signal. The circuitry may comprise a power circuit for energizing a lamp and/or a sound output device and/or a vibrator. The sound output device may, for example, be capable of emitting a beep sound. The circuitry may further comprise a relay for controlling the power transmitted through the power circuit.

The detector may comprise circuitry for detecting whether the actual angular position exceeds said predetermined range of angular positions of the depilating member. The circuitry may, for example, comprise two complementary conductors which either contact each other or are separated depending on whether the pivot angle corresponds to the predetermined range of angular positions (first range).

In this context, the detector may detect a pivot angle of a skin contact member arranged adjacent to the depilating member and being pivotable relative to the housing about a pivot axis extending parallel to a skin contact surface of the depilating device.

The feedback means may alternatively be mechanical feedback means. Thus the feedback signal may be generated mechanically, without making use of circuitry.

The mechanical feedback means may in particular comprise mechanical indication means for providing an optical feedback signal. The mechanical indication means may, for example, comprise a slide indicator exhibiting either a first portion colored in a first color (e.g. green), or a second portion colored in a second color (e.g. red).

These and other aspects of the invention will be apparent from and elucidated further with reference to the embodiments described hereinafter.

BRIEF DESCRIPTION OF THE DRAWINGS

FIG. 12 is a simplified bottom view of a depilating device having a skin contact member, according to a first embodiment.

FIG. 13 is a simplified bottom view of two carriers and two springs of the depilating device shown in FIG. 12, for an optimal first range of application angles.

FIG. 14 is a simplified bottom view of the carriers and springs shown in FIG. 13, for a suboptimal second range of application angles.

FIG. 21 is a partial front view of a depilating device according to a fourth embodiment, for an application angle of 90°.

FIG. 22 is a partial side view of the depilating device shown in FIG. 21.

FIG. 23 is a partial front view of the depilating device shown in FIG. 21, for an application angle of 84°.

FIG. 24 is a partial side view of the depilating device shown in FIG. 23.

DESCRIPTION OF PREFERRED EMBODIMENTS

Figure 1:
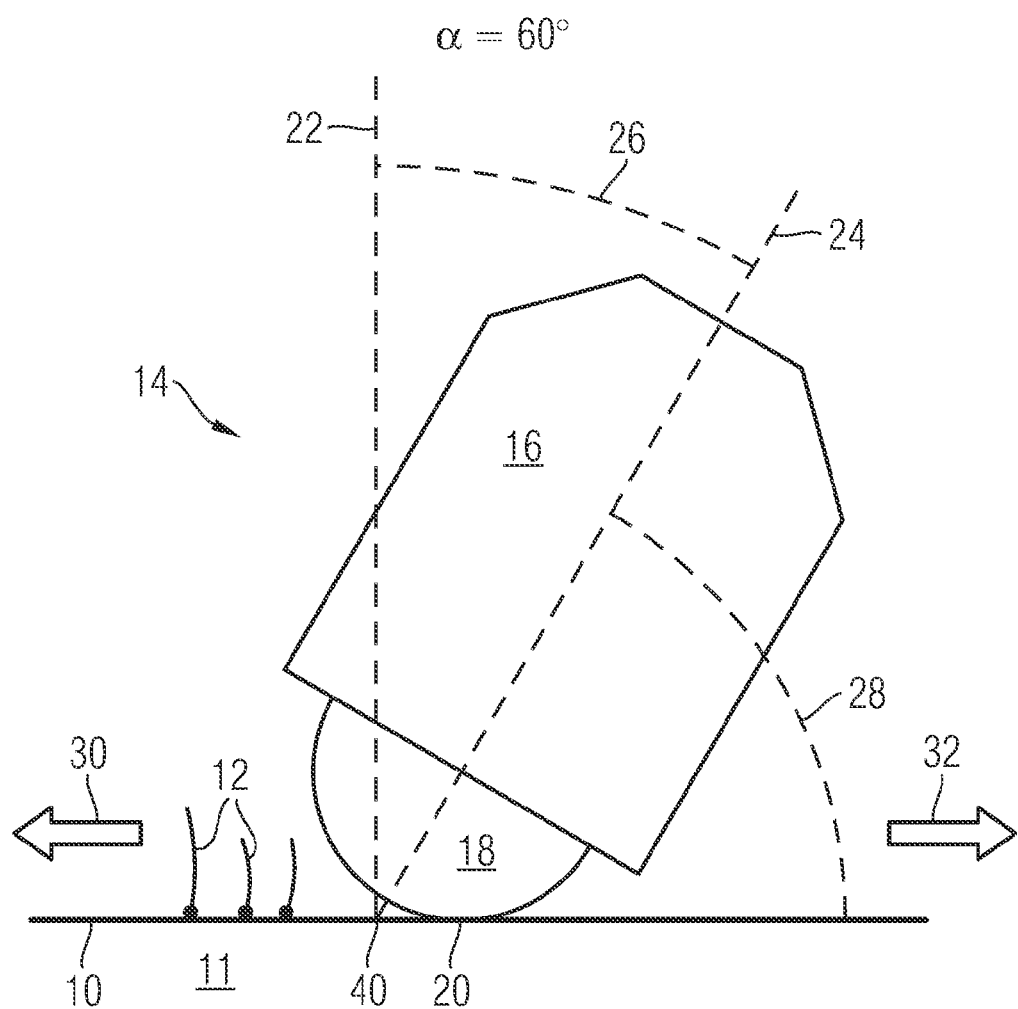
FIG. 1 is a simplified side view of a generic depilating device.

In the drawings, similar or analogous features appearing in different Figures are designated using the same reference numerals and are not necessarily described more than once.

FIG. 1 schematically illustrates an example of a generic depilating device 14 applied to skin 11 by a user (not shown). The depilating device 14 comprises a depilating member 18 contacting the skin 11 at a skin contact surface 20, and a body 16 for being held by the user. The body 16 may, for example, include a housing enclosing a motor (not shown) coupled to the depilating member 18 for driving the depilating member 18. The depilating member 18 is designed for removing or cutting hairs 12 on the skin 11 when brought into contact with the hairs 12. The depilating member 18 may be of any type known in the art. The depilating member 18 may, for example, comprise rotatable clamping discs for extracting hairs 12 from the skin 11, or cutter teeth, or a shaving foil for cutting the hairs 12. The depilating device 14 is designed for being moved by the user across the skin 11 in either the moving direction 30 or in the moving direction 32, the moving directions 30 and 32 being opposite to each other. The body 16 has a longitudinal axis 24 which in the illustrated case coincides with the intersection of a first symmetry plane and a second symmetry plane of the body 16, the first symmetry plane being parallel to the Figure and the second symmetry plane being perpendicular to it, wherein the outer shape of the body 16 is essentially symmetric under reflections by the first symmetry plane and under reflections by the second symmetry plane. The longitudinal axis 24 defines an angle 28 relative to the surface 10 of the skin 11. The angle 28 thus defined is referred to as the application angle (α) 28. The application angle 28 is thus defined as the inclination of the body 16 relative to the surface 10 of the skin 11. Alternatively, the application angle could be defined relative to a normal axis 22 perpendicular to the surface 10 of the skin 11, the normal axis 22 intersecting the surface 10 of the skin 11 at point 40. In the Figure, the application angle 28 is 60°. Accordingly the angle 26 between the normal axis 22 and the longitudinal axis 24 is 30°. In the example shown, the total allowed range for the application angle 28 is approximately 15° to 165°. The total allowed range is understood to be that range of application angles in which depilation by the depilating device 14 is possible. However the depilating device 14 behaves unsatisfactorily or at least not in an optimal manner if the application angle 28 is not within a certain sub range of the total allowed range. In other words, the depilating device 14 has an operational characteristic which depends on the application angle 28 and which is optimum only for a certain value of the application angle 28 or for a sub range of application angles 28, the sub range being substantially smaller than the total allowed range of application angles. The operational characteristic may, for example, be the effectiveness in removing hairs 12 from the skin 11, or, in the case where the depilating member 18 is designed for cutting hair, the average length of the remaining stubs of hair. The overall performance of the depilating device 14 may be optimum when the depilating device is applied at a right angle to the skin 11, i.e. for an application angle 28 of about 90°, in which case the normal axis 22 coincides with the longitudinal axis 24. The range of application angles 28 for which the depilating device 14 functions properly typically covers about 30° and is centered on an optimum application angle. The optimum application angle is typically 90°, but this is not necessarily the case. Depending on the device design, for some devices the optimum application angle may, for example, be about 60°. Furthermore some depilating devices may have two optimum application angles, such as 60° and −60°, or even more.

The definition of the application angle 28 depends on how the longitudinal axis 24 is defined relative to the depilating device 14. It is also noted that depilating devices are known or may be conceived in which the depilating member 18 can be inclined relative to the body 16 by a variable angle. In this case, it may be convenient to define the longitudinal axis relative to the depilating member 18 rather than to the body 16.

It has been mentioned above that the user does not necessarily apply the depilating device 14 at an optimal application angle 28, in particular if the user is not aware of the correct application angle. For example, if the optimum application angle is 90° with a tolerance of 15°, the user may tilt the depilating device beyond the optimal range of application angles of 75° to 105°. In the particular case of a depilating device 14 having a depilating member 18 that comprises tweezers for extracting hairs, an optimal depilation result may then not be achieved because the tweezers lift up relative to the skin 11.

Figure 2:
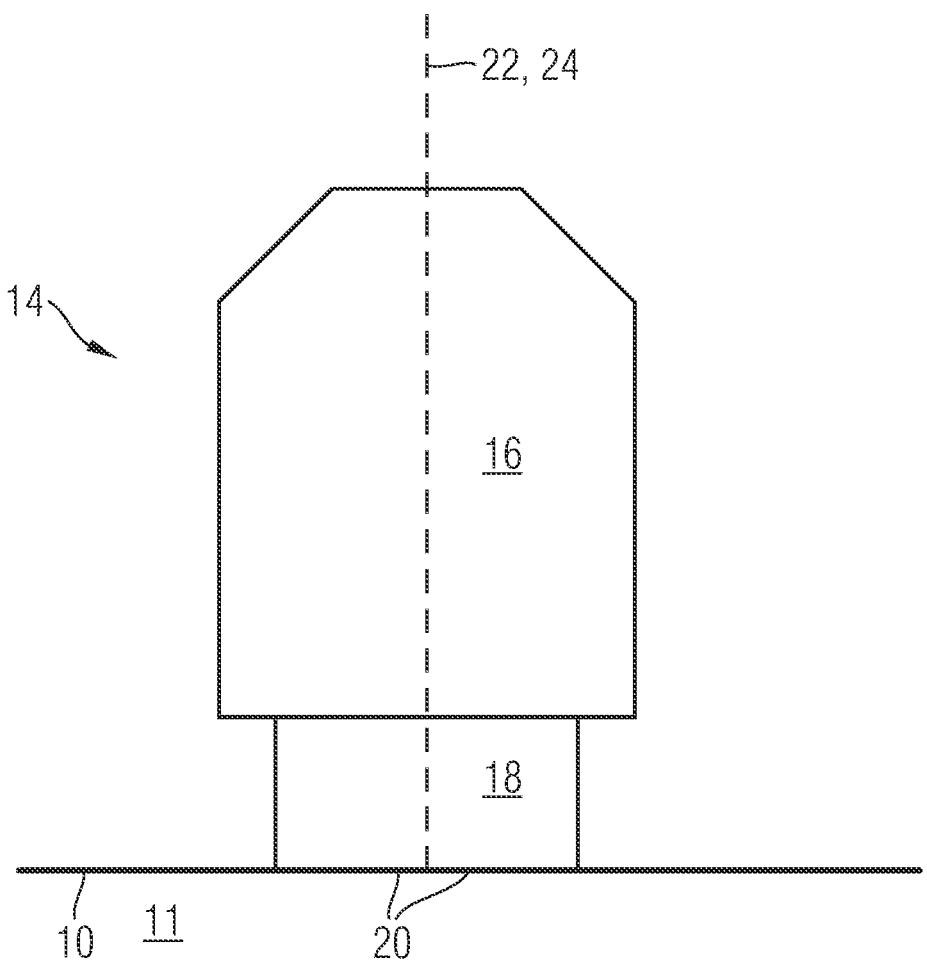
FIG. 2 is a simplified front view of the device shown in FIG. 1.

FIG. 2 is a simplified front view of the depilating device 14 discussed above with reference to FIG. 1, as seen when looking in the moving direction 30. The depilating member 18 contacts the skin 11 via the elongated skin contact surface 20 perpendicular to the moving directions 30, 32 shown in FIG. 1. Depending on the design of the depilating member 18, the elongated skin contact surface 20 may be continuous, for example, in the case where the depilating member 18 comprises a flexible shaving foil, or discontinuous, for example in the case where the depilating member 18 comprises a plurality of clamping discs (not shown), each clamping disc contacting the surface 10 of the skin 11 on a segment of its circumference.

Figure 3:
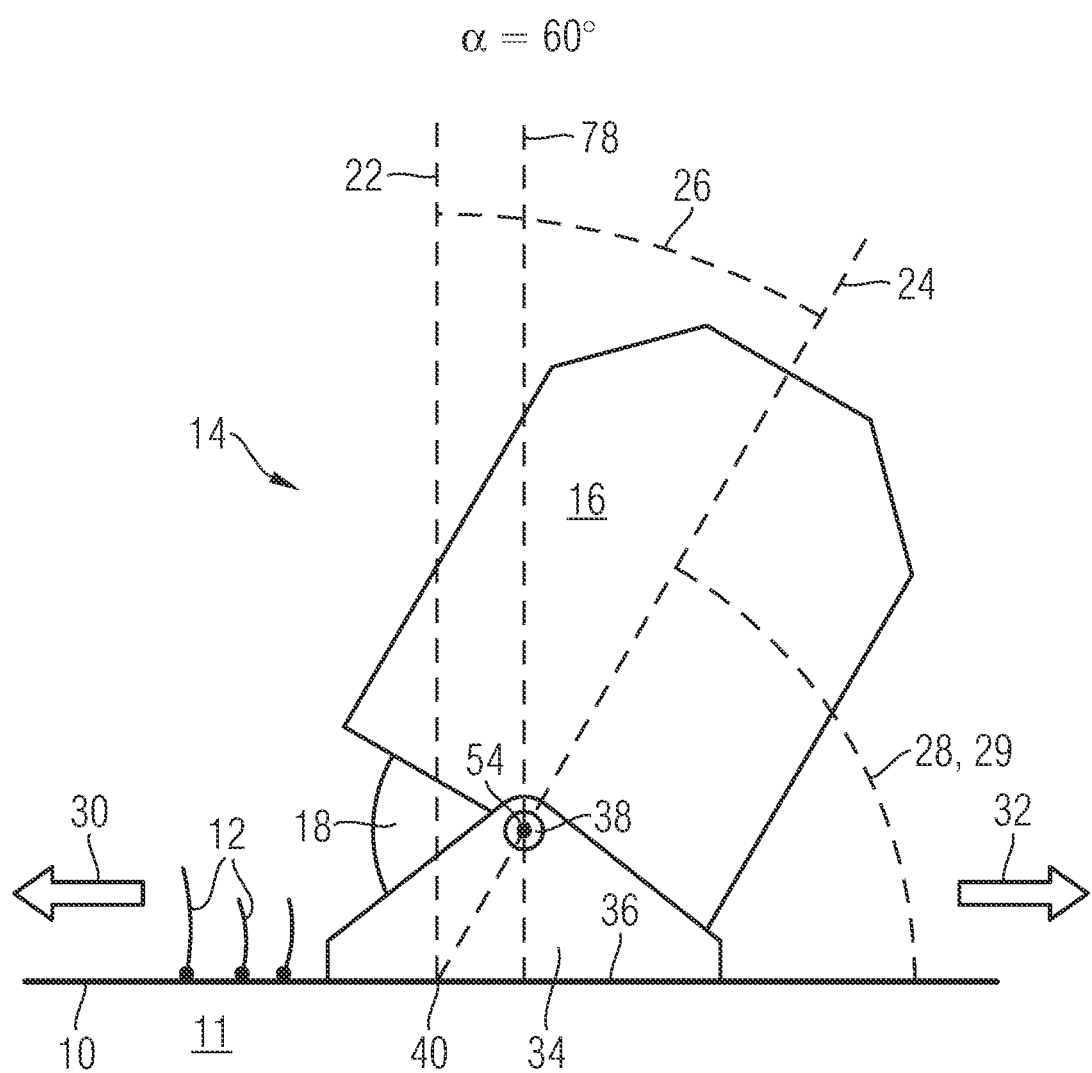
FIG. 3 is a simplified side view of a depilating device having a pivotable skin contact member, for an application angle of 60°.

Referring now to FIG. 3, there is shown in a simplified manner a depilating device 14 comprising a depilating member 18 for removing hair 12 from skin 11, and a feedback mechanism for generating a tactile and/or acoustic and/or optical feedback signal when the application angle 28 (i.e. the angle 28 between the longitudinal axis 24 of the depilating device 14 and the skin 11) passes from a predefined first range to a predefined second range while the depilating member 18 is applied to the skin 11. The second range adjoins the first range and depilation is possible both when the application angle 28 is in the first range and when the application angle 28 is in the second range. The depilating device 14 has a characteristic which is a function of the application angle 28 and which is optimum for an optimum application angle, the optimum application angle being in the first range. In the example shown, the first range lies between the second range and a third range, the first, second and third range comprising application angles between 75° and 105°, less than 75°, and more than 105°, respectively. The feedback signal will alert a user (not shown) of the device 14 when the application angle 28 passes from the first range to the second range of application angles, e.g. from 76° to 74°. The feedback mechanism generates a tactile and/or acoustic and/or optical feedback signal also when the application angle 28 passes from the first range to the third range (e.g. from 104° to 106° while the depilating member 18 is applied to the skin 11. The longitudinal axis 24 is fixed relative to the body 16 for holding the depilating device 14. The skin contact member 34 is attached to the body 16 of the depilating device 14 by means of an axle 38. The axle 38 defines a pivot axis 54 about which the skin contact member 34 is pivotable relative to the body 16. The pivot axis 54 defined by the axle 38 extends parallel to the skin contact surface 36 and perpendicularly to the moving directions 30 and 32 and, when the depilating device 14 is applied to the skin 11, the pivot axis 54 is also parallel to the surface 10 of the skin 11. In the example shown, the axle 38 is offset relative to the surface of the skin 10 on an axis 78 perpendicular to the skin 11. The application angle 28 may be varied by pivoting the body 16 relative to the skin contact member 34 about the pivot axis 54, the skin contact member 34 remaining fixed relative to the skin 11, at least as long the application angle 28 is within the first, second, or third range. It is noted that pivoting the body 16 about the pivot axis 54 implies shifting the intersection point 40 parallel to the surface of the skin 11. The skin contact member 34 has an essentially plane skin contact surface 36 for contacting the skin 11. When the depilating device 14 is applied to the skin 11, as shown in the Figure, the skin contact surface 36 is parallel to the surface 10 of the skin 11. Thus the pivot angle 29 defined as the angle between the longitudinal axis 24 and the skin contact surface 36 coincides with the application angle 28. In fact a primary purpose of the skin contact member 34 is to translate the application angle 28 into an internal angle, namely the pivot angle 29, of the depilating device 14. Thus the feedback signal is delivered when the pivot angle 29 passes from the predefined first range to the predefined second range. The feedback mechanism thus involves triggering the feedback signal as a function of the variation of the pivot angle 29. In the Figure, the application angle ($\alpha$) 28 and hence the pivot angle 29 equal 60°.

Figure 4:
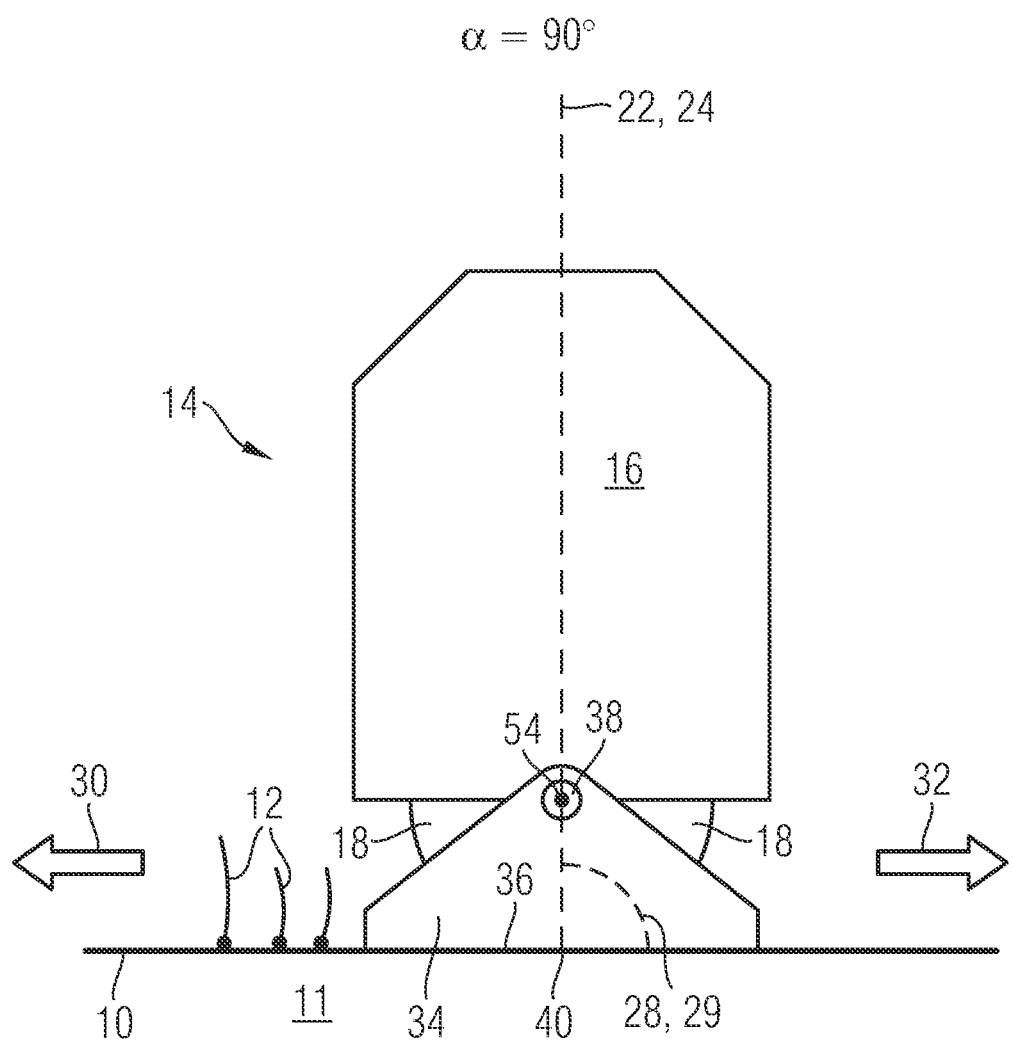
FIG. 4 is a simplified side view of the depilating device shown in FIG. 3, for an application angle of 90°.
Figure 5:
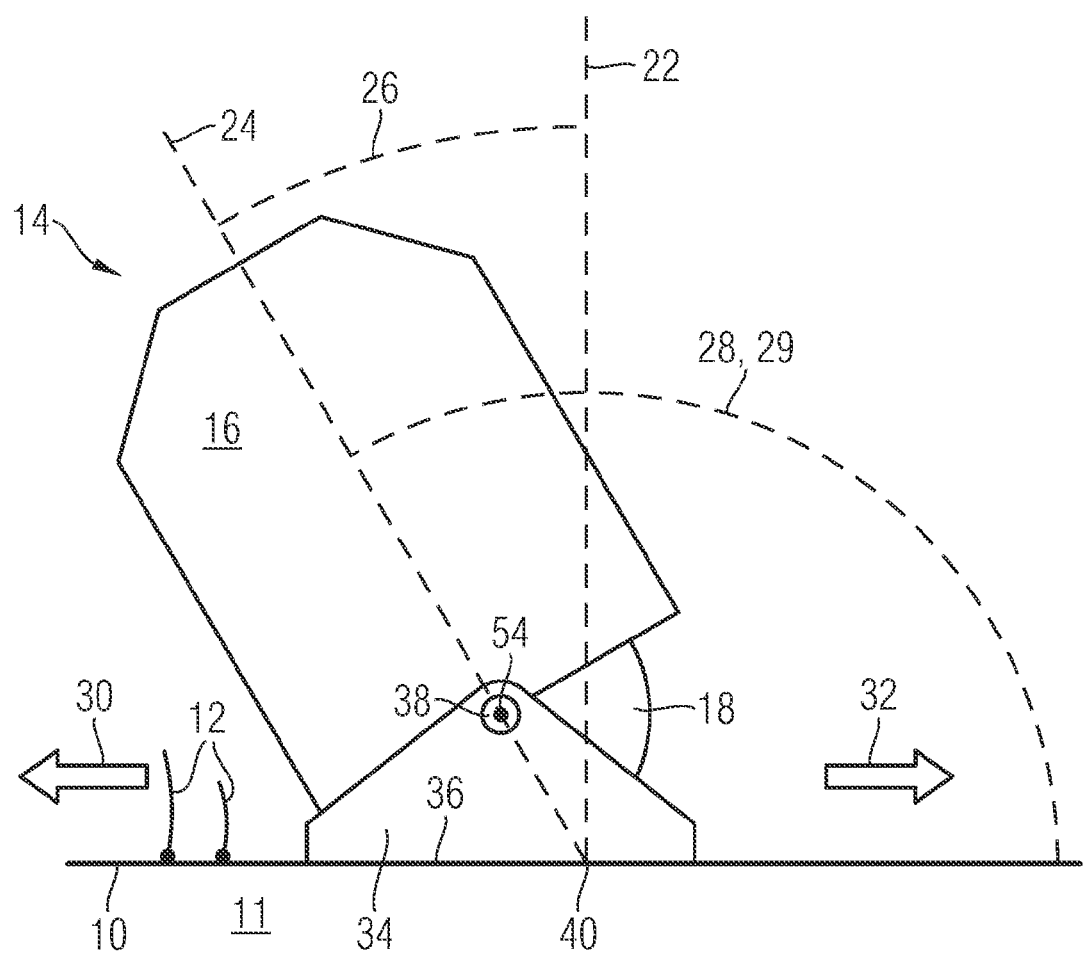
FIG. 5 is a simplified side view of the depilating device shown in FIG. 3, for an application angle of 120°.

FIGS. 4 and 5 further illustrate the depilating device 14 discussed above with reference to FIG. 3, for different values of the application angle ($\alpha$) 28. In FIG. 4 the application angle 28 equals 90°, the longitudinal axis 24 being perpendicular to the surface 10 of the skin 11. In FIG. 5, the application angle 28 is 120°.

In FIGS. 6 to 9, there is schematically illustrated a depilating device 14 comprising a body 16 and a skin contact member 34 having a skin contact surface 36. The body 16 is pivotable relative to the skin contact member 34 about a pivot axis 54. The pivot axis 54 is perpendicular to the longitudinal axis 24 of the body 16 and extends parallel to the skin contact surface 36 and also parallel to the surface 10 of the skin 11 as long as the depilating device 14 is applied to the skin 11 in an operational position. An operational position is understood to be a position of the depilating device 14 relative to the skin 11 to be treated, such that the depilating device 14 is able to depilate the skin 11 in an optimal or in a suboptimal manner. The longitudinal axis 24 of the body 16 defines an application angle 28 relative to the skin 11. The longitudinal axis 24 further defines a pivot angle 29 relative to the skin contact surface 36. The application angle 28 and the pivot angle 29 coincide as long as the skin contact surface 36 is parallel to the surface 10 of the skin 11. The total possible range for the application angle 28 comprises an optimal first range 5, a suboptimal second range 3, a suboptimal third range 7, and suboptimal non-working ranges 1 and 9. The non-working range 1, the suboptimal second range 3, the optimal first range 5, the suboptimal third range 7, and the non-working range 9 are adjoining and are separated by borders 2, 4, 6, and 8, respectively. In the example shown, the border 2 between the non-working range 1 and the suboptimal second range 3 is at 60°; the border 4 between the suboptimal second range 3 and the optimal first range 5 is at 75°; the border 6 between the optimal first range 5 and the suboptimal third range 7 is at 105°; and the border 8 between the suboptimal third range 7 and the non-working range 9 is at 120°. By changing the inclination of the body 16 relative to the skin, a user of the depilating device 14 may vary the value of the application angle 28 in a continuous manner. In the example shown, the application angle 28 may thus assume any value between around 0° and 180°, although depilation is impossible for application angles smaller than about 60° or larger than about 120°. In line with the invention, the depilating device 14 generates a feedback signal when the application angle 28 passes from the optimal first range 5 to the suboptimal second range 3 as the application angle 28 crosses the border 4 between the first range 5 and the second range 3. The depilating device 14 also generates a feedback signal when the application angle 28 passes from the optimal first range 5 to the suboptimal third range 7 as the application angle 28 crosses the border 6 between the first range 5 and the third range 3. Additionally, feedback signals may be provided for the contrary sense of movement, that is, when the application angle 28 enters the optimal first range 5 either from the suboptimal second range 3 or from the suboptimal third range 7.

Figure 6:
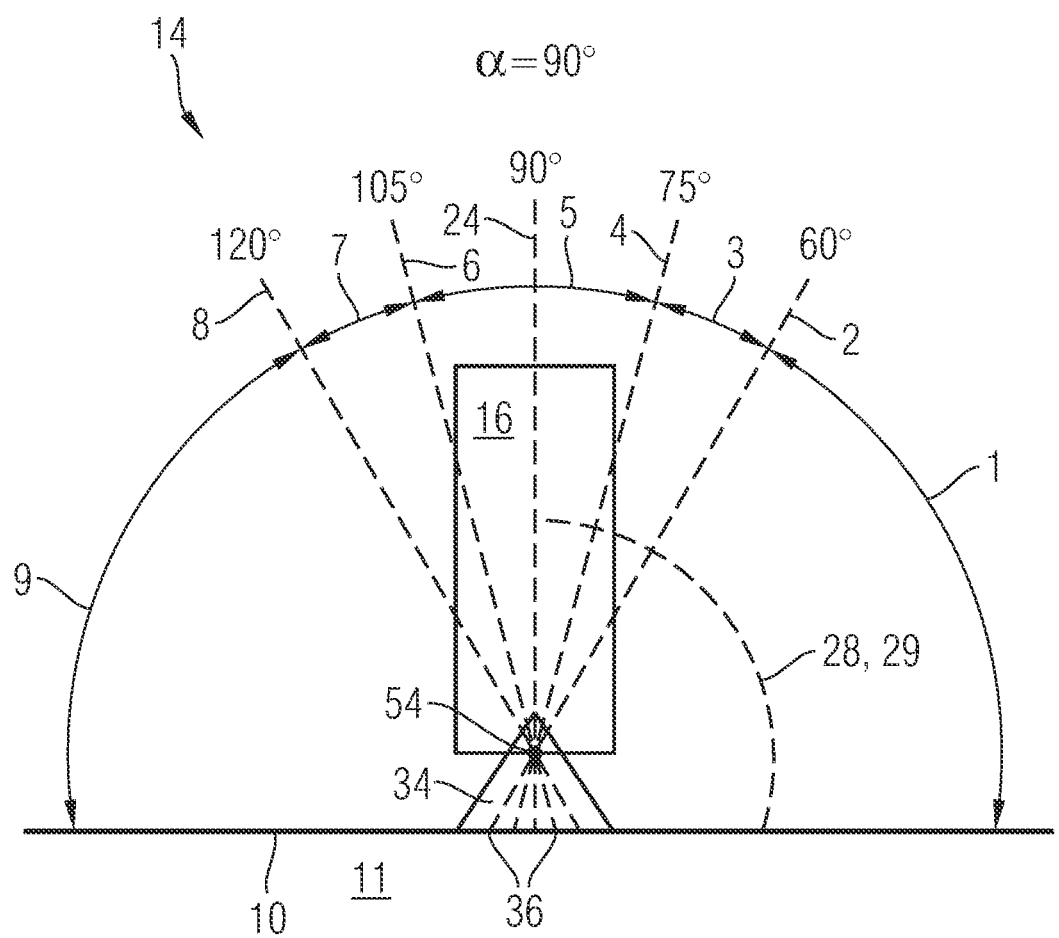
FIGS. 6-9 schematically illustrate a depilating device having a skin contact member, for different application angles.

In FIG. 6, the depilating device 14 is applied to the skin 11 at an application angle 28 of 90°, i.e. the longitudinal axis 24 of the body 16 is perpendicular to the surface 10 of the skin 11. From the direction of the longitudinal axis 24, the application angle 28 is seen to lie in the optimal first range 5. In the present example, the application angle 28 of 90° is an optimal application angle, in the sense that depilation by the depilating device 14 is most efficient for this particular value of the application angle 28.

Figure 7:
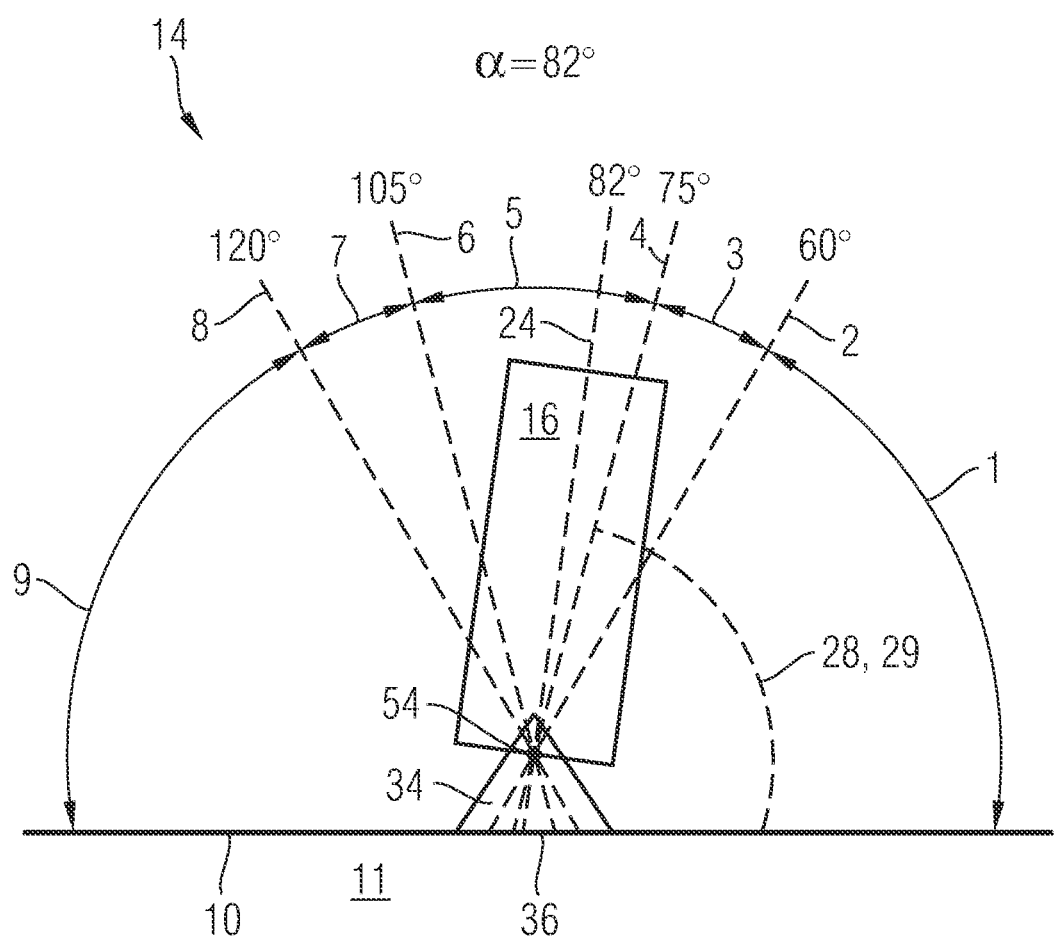

In FIG. 7, the depilating device 14 is applied to the skin 11 at an application angle 28 of 82°. From the direction of the longitudinal axis 24, the application angle 28 is seen to lie still in the optimal first range 5.

Figure 8:
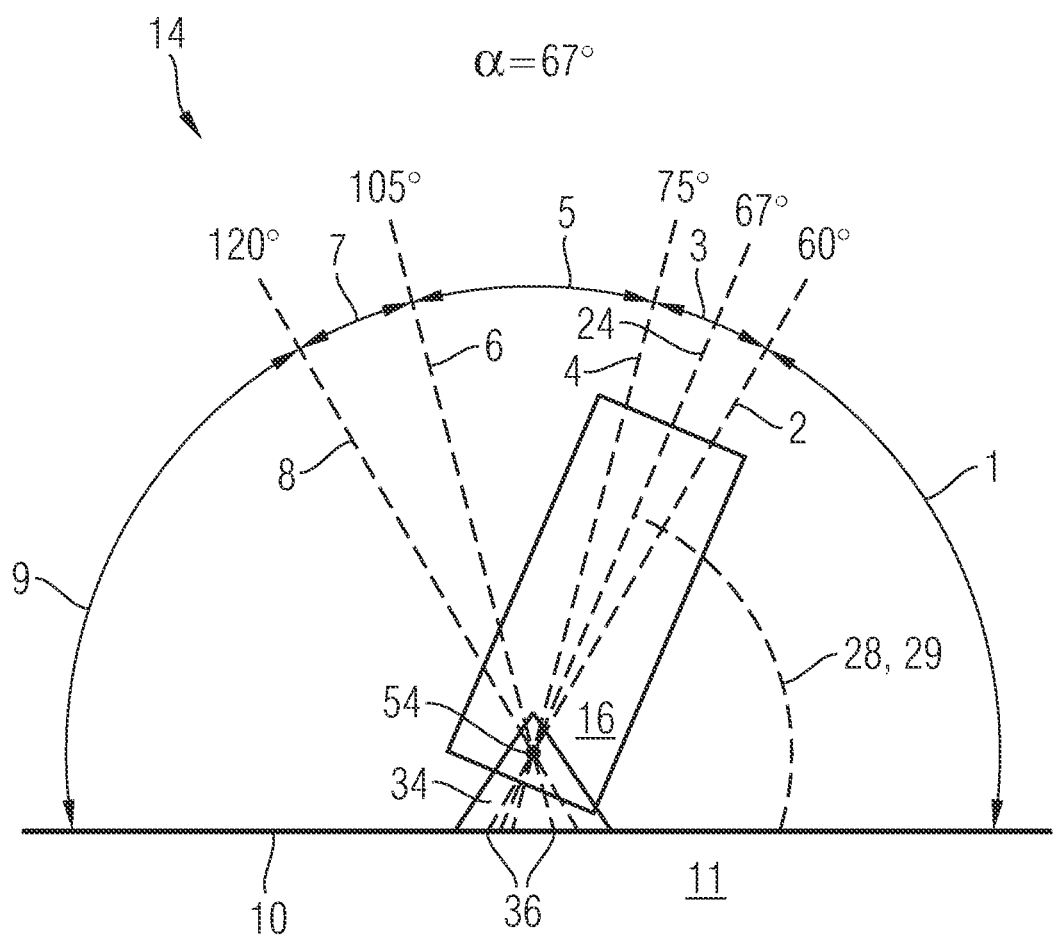

In FIG. 8, the depilating device 14 is applied to the skin 11 at an application angle 28 of 67°. From the direction of the longitudinal axis 24, the application angle 28 is seen to lie in the suboptimal second range 3. It is noted that when the application angle 28 is within any of the optimal first range 5, the suboptimal second range 3, and the suboptimal third range 7, the pivot angle 29 coincides with the application angle 28, the skin contact surface 36 of the skin contact member 34 then being parallel to the surface 10 of the skin 11.

Figure 9:
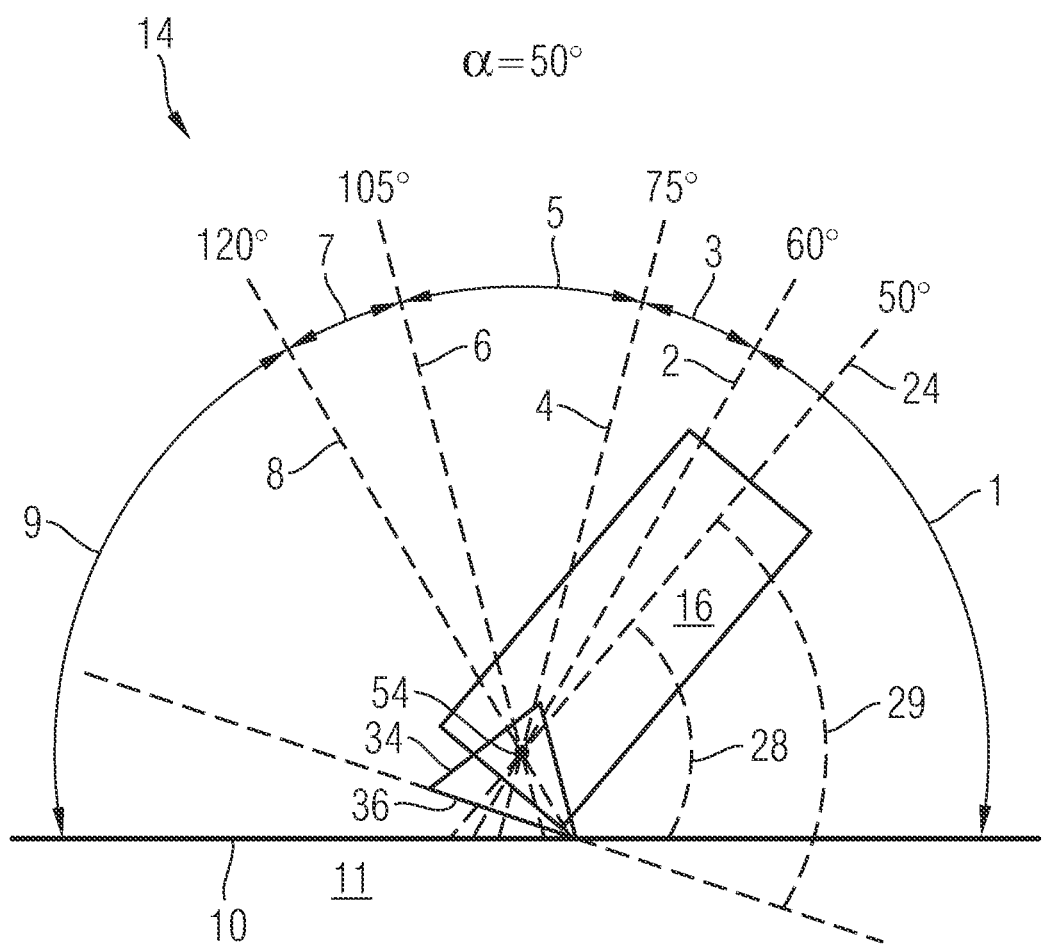

In FIG. 9, the depilating device 14 is applied to the skin 11 at an application angle 28 of only 50°. From the direction of the longitudinal axis 24, the application angle 28 is seen to lie in the non-working second range 1. The pivot angle 29 now differs from the application angle 28. The reason is that in the embodiment shown, the pivot angle 29 is restricted to the range consisting of the optimal first range 5, the suboptimal second range 3, and the suboptimal third range 7. When the pivot angle 29 reaches the minimum allowed value of 60°, a part of the body 16 contacts another part of the skin contact member 34 such that pivoting the body 16 any further relative to the skin contact member 34 is mechanically impossible.

Thus, when the application angle 28 is in any of the non-working ranges 1 and 9, the skin contact member 34 partially lifts off the skin 11 such that the skin contact surface 36 is no longer parallel to the surface 10 of the skin 11. The skin contact surface 36 being not parallel to the skin 11, the application angle 28 and the pivot angle 29 differ. It is pointed out, however, that the pivotable skin contact member may alternatively be designed such that its pivot angle coincides with the application angle for all possible values of the application angle.

Figure 10:
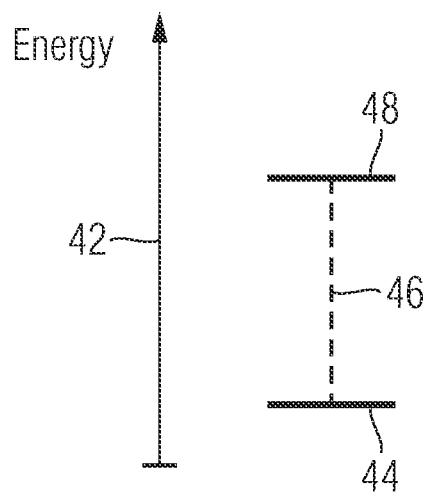
FIG. 10 schematically illustrates a first state and a second state of a depilating device.

Referring now to FIG. 10, there are schematically represented two internal states 44 and 48 of a depilating device comprising a feedback mechanism for generating a tactile and/or acoustic and/or optical feedback signal when the application angle, defined as the angle between the skin surface and a longitudinal axis of the depilating device, passes from a predefined first range to a predefined second range while the depilating device is applied to the skin. An internal state is understood to be a state of the device which depends only on the depilating device itself but not on any relation between the device and its surroundings. In particular the position or inclination of the device relative to the skin is not an internal state of the device. An internal state may, for example, be characterized by the mutual positions of members of the depilating device. The depilating device may be designed such that when the application angle is in the first range the depilating device is in the first state 44 and when the application angle is in the second range the depilating device is in the second state 48. The second state 48 is energetically higher than the first state 44. Furthermore the first state 44 is coupled to the second state 48 as symbolized by the dashed line 46. Thus, if the depilating device is left isolated, it may automatically return from the second state 48 to the first state 44, wherein the energy difference between the first state 44 and the second state 48 may be dissipated, for example by friction. The second state 48 being energetically higher than the first state 44 means that a user of the device needs to supply energy in order to make the application angle pass from the first range to the second range. In particular the user may need to apply a certain force, hence a certain amount of energy, to cause a transition from the first state 44 to the second state 48. Thus, when tilting the depilating device such that the application angle passes from the first to the second range, the user may experience a mechanical resistance of the depilating device, the resistance constituting a tactile feedback signal.

Figure 11:
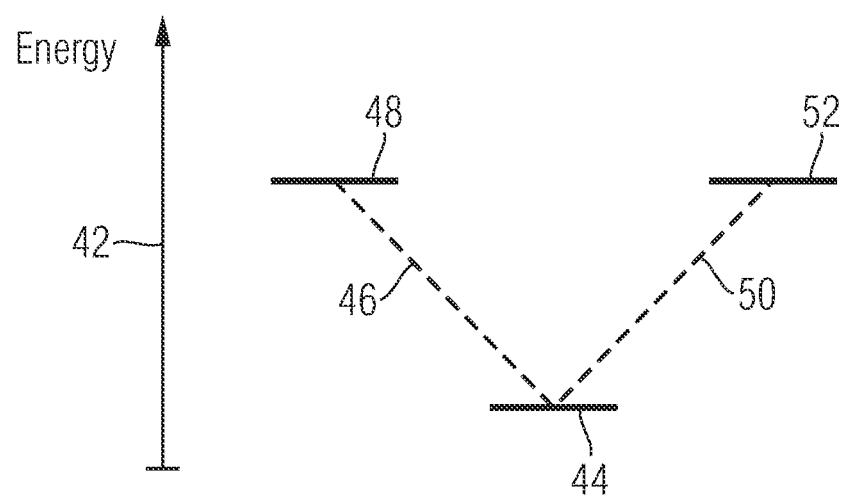
FIG. 11 schematically illustrates a first state, a second state, and a third state of a depilating device.

Schematically represented in FIG. 11 are three internal states of a depilating device having a feedback mechanism for generating a tactile and/or acoustic and/or optical feedback signal when the application angle passes from a predefined first range to a predefined second range or from the predefined first range to a predefined third range while the depilating device is applied to the skin. When the application angle is in the first range, the depilating device is in its first internal state 44. When the application angle is in the second or third range, the depilating device is in the second internal state 48 or in the third internal state 52, respectively. Both the second internal state 48 and the third internal state 52 are higher in energy compared to the first internal state 44. In the example shown, the second internal state 48 and the third internal state 52 are equal in energy. A physical coupling 46 exists between the first internal state 44 and the second internal state 48. Similarly a physical coupling 50 exists between the first internal state 44 and the third internal state 52. Due to the couplings 46 and 50, the depilating device may return automatically from the second internal state 48 and from the third internal state 52 to the first internal state 44.

Referring now to FIG. 12, there is shown in a schematic and simplified manner a bottom view of a depilating device 14 of the type discussed above with reference to FIGS. 3 to 5. The skin contact member 34 has the skin contact surface 36 and forms a frame surrounding a treatment window through which the depilating member 18 may contact the skin (not shown). The pivot axis 54 is defined by the axle 38 (not shown) by means of which the body 16 (not shown) may be pivoted relative to the skin contact member 34. Rigidly attached to opposite inner side walls 57 and 59 are a carrier 58 for engaging with a spring 62 and a carrier 56 for engaging with another spring 60. Each of the carriers 58 and 60 has two bearings, as will be illustrated in greater detail with reference to FIGS. 13 to 18. The spring 60 is mobile relative to the carrier 56 in the sense that it may engage with either of the two bearings of the carrier 56, depending on whether the pivot angle 29 (not shown) is in a predefined first range or in a predefined second range. In the Figure, the pivot angle is assumed to be within the first range. For the sake of clarity, the first range is assumed here and with reference to FIGS. 13 to 18 to be the angular range from 75° to 105°.

Figure 15:
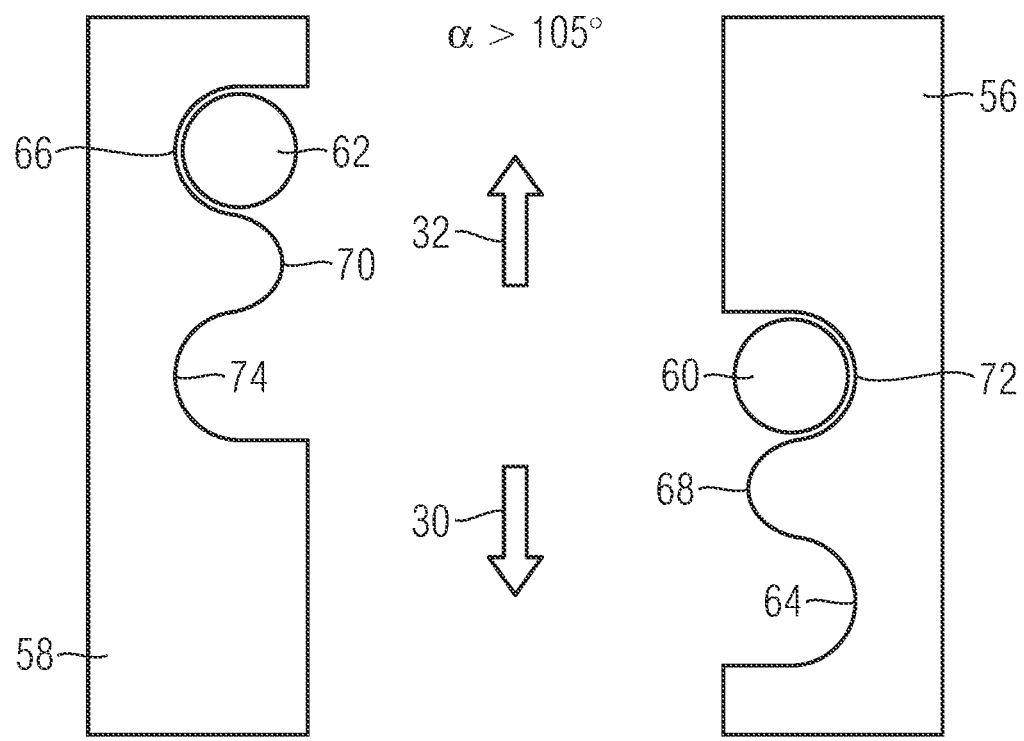
FIG. 15 is a simplified bottom view of the carriers and springs shown in FIG. 13, for a suboptimal third range of application angles.

FIGS. 13, 14, and 15 provide more detailed bottom views of the carriers 56 and 58 introduced above with reference to FIG. 12. The carrier 56 comprises a bearing 72 for engaging with the spring 60 when the pivot angle 29 (see FIGS. 3 to 5 and 12 to 14) is larger than 75°. The carrier 56 also comprises a bearing 64 for engaging with the spring 60 when the pivot angle is less than 75°. Similarly, the carrier 58 comprises a bearing 74 for engaging with the spring 62 when the pivot angle is less than 105°, and a bearing 66 for engaging with the spring 62 when the application angle is larger than 105°. Each of the bearings 64, 66, 72 and 74 is provided by a notch traversing the carrier 56 respectively the carrier 58 in a direction perpendicular to the skin contact surface 36 shown in FIGS. 3, 4, 5, and 8. The notch providing the bearing 64 and the notch providing the bearing 72 of the carrier 56 are separated by a barrier 68 preventing a transition of the spring 60 from the bearing 72 to the bearing 64 and vice-versa if no force is exerted on the spring 60 or by the spring 60 itself. The bearings 66 and 74 of the carrier 58 are arranged similarly to those of the carrier 56.

Figure 16:
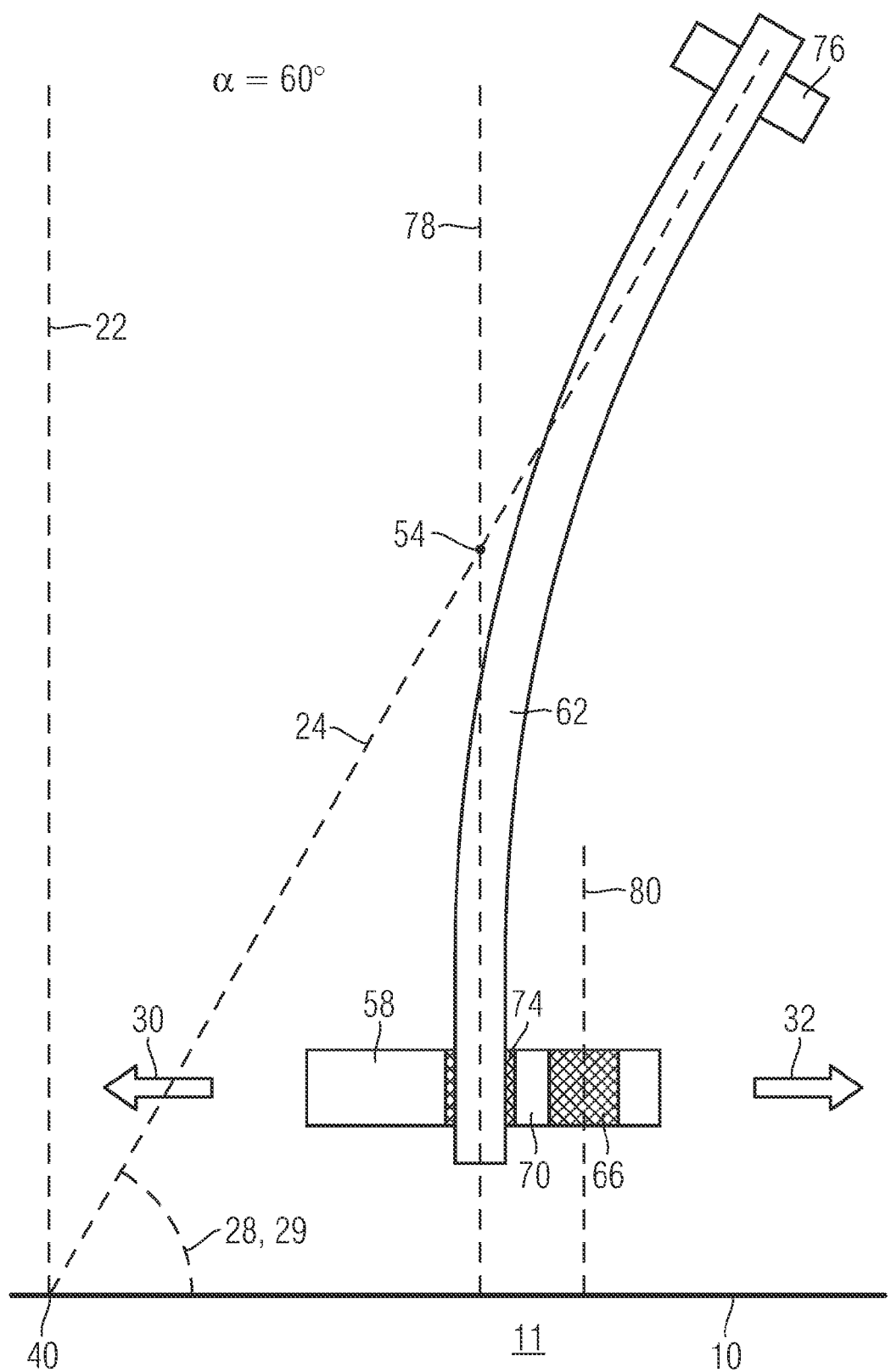
FIG. 16 is a simplified side view of one of the carriers and the associated spring shown in FIGS. 13 to 15, for an application angle of 60°.
Figure 17:
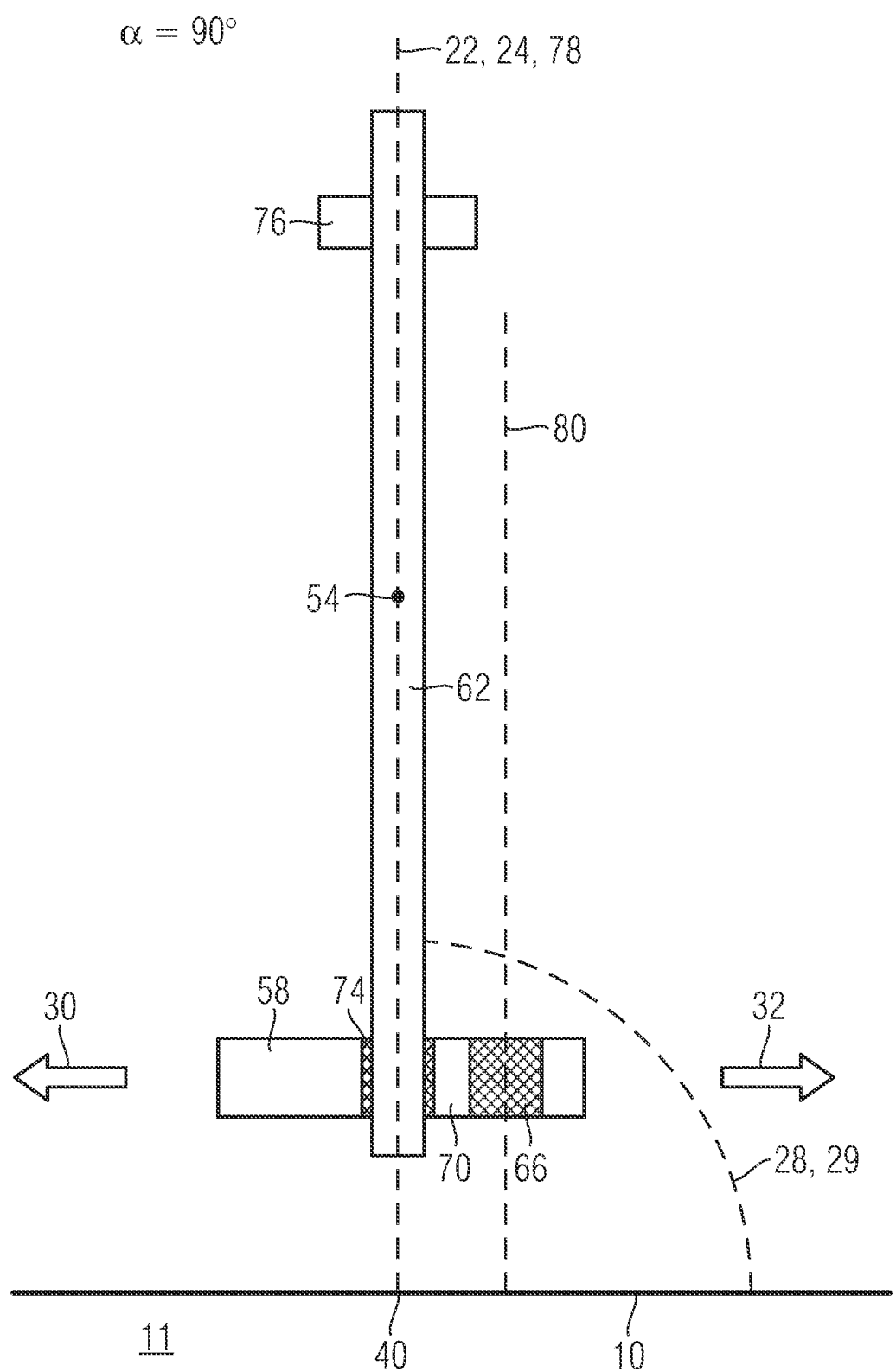
FIG. 17 is a simplified side view of the carrier and spring shown in FIG. 16, for an application angle of 90°.
Figure 18:
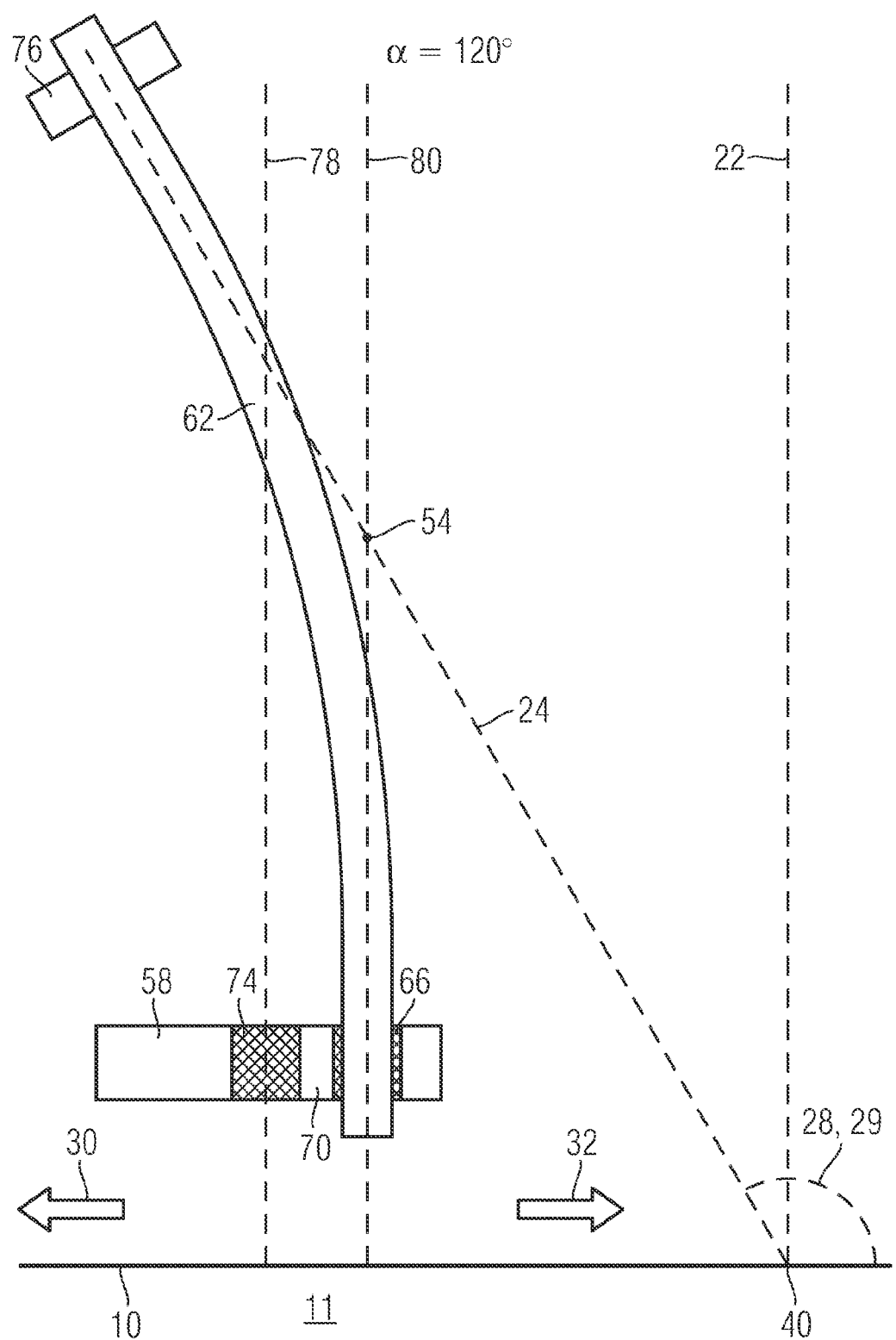
FIG. 18 is a simplified side view of the carrier and spring shown in FIG. 16, for an application angle of 120°.

FIGS. 16, 17, and 18 are simplified side views of the carrier 58 and the spring 62 discussed above with reference to FIGS. 12 to 15, for three different values of the application angle 28. The depilating device 14 being applied to the skin 11, the pivot angle 29 defined by the orientation of the skin contact member 34 (shown in FIG. 12) relative to the longitudinal axis 24 is identical to the application angle 28. In each of FIGS. 16, 17, and 18, the carrier 58 and the spring 62 are shown relative to the skin 11 and the moving directions 30, 32. Also indicated is the pivot axis 54 of the skin contact member 34. A support 76 is rigidly attached to a housing 16 (not shown) of the depilating device 14. To facilitate the understanding of the Figures, the skin 11, the carrier 58 and the pivot axis 54 may be assumed immobile, whereas the support 76 may be pivoted about the pivot axis 54. The spring 62 may for example be a thin metal rod or leaf. An upper end of the spring 62 is maintained by the support 76 while a lower end of the spring 62 engages with either the bearing 66 or the bearing 74. The relative position of the support 76 and the carrier 58 determines the shape of the spring 62 and also the bearing 74 or 66 the spring 62 engages with. The support 76 holds the spring 62 by means of a notch oriented along the longitudinal axis 24 such that the spring 62 would extend along the longitudinal axis 24 from the support 76 toward the intersection point 40 of the longitudinal axis 24 and the skin surface 10 if the spring's lower end were free. The support 58 forces the lower end of the spring to point along an axis 78 defined by the bearing 74 or along an axis 80 defined by the bearing 66, depending on whether the spring 62 engages with the bearing 74 or with the bearing 66.

In FIG. 16, the application angle is 60°. The spring 62 engages with the bearing 74 so as to minimize its energy, since, if the spring 62 engaged with the bearing 66, it would have to bend more and would thus possess more energy as compared to the configuration shown. In other words, the spring 62 "chooses" the bearing 74 or 66 so as to minimize its deviation from a straight line.

In FIG. 17, the application angle 28 is 90°. The spring 62 accordingly engages with the bearing 74 of the carrier 58 so as to minimize its energy.

In FIG. 18, the application angle 28 is 120°. The spring 62 engages with the bearing 66 of the carrier 58 so as to minimize its energy. If it engaged with the bearing 74, it would have to bend more and would thus have more energy.

Comparing FIGS. 17 and 18, it is noted that the spring 62 performs a transition from the bearing 74 to the bearing 66 as the application angle 28 passes from 90° to 120°. The bearings 74 and 66 and the barrier 70 separating them are shaped such that the spring's 62 transition from the bearing 74 to the bearing 66 happens abruptly at a predetermined value of the pivot angle 29, for example at 105°. The abrupt transition produces, via the skin contact member 34, a palpable effect on the skin 11. Furthermore it produces a click sound. The spring's 62 transition from the bearing 74 to the bearing 66 (and possibly also its back transition from the bearing 66 to the bearing 74 when the pivot angle 29 passes from 120° to) 90°) thus produces a tactile and/or acoustic feedback signal.

Figure 19:
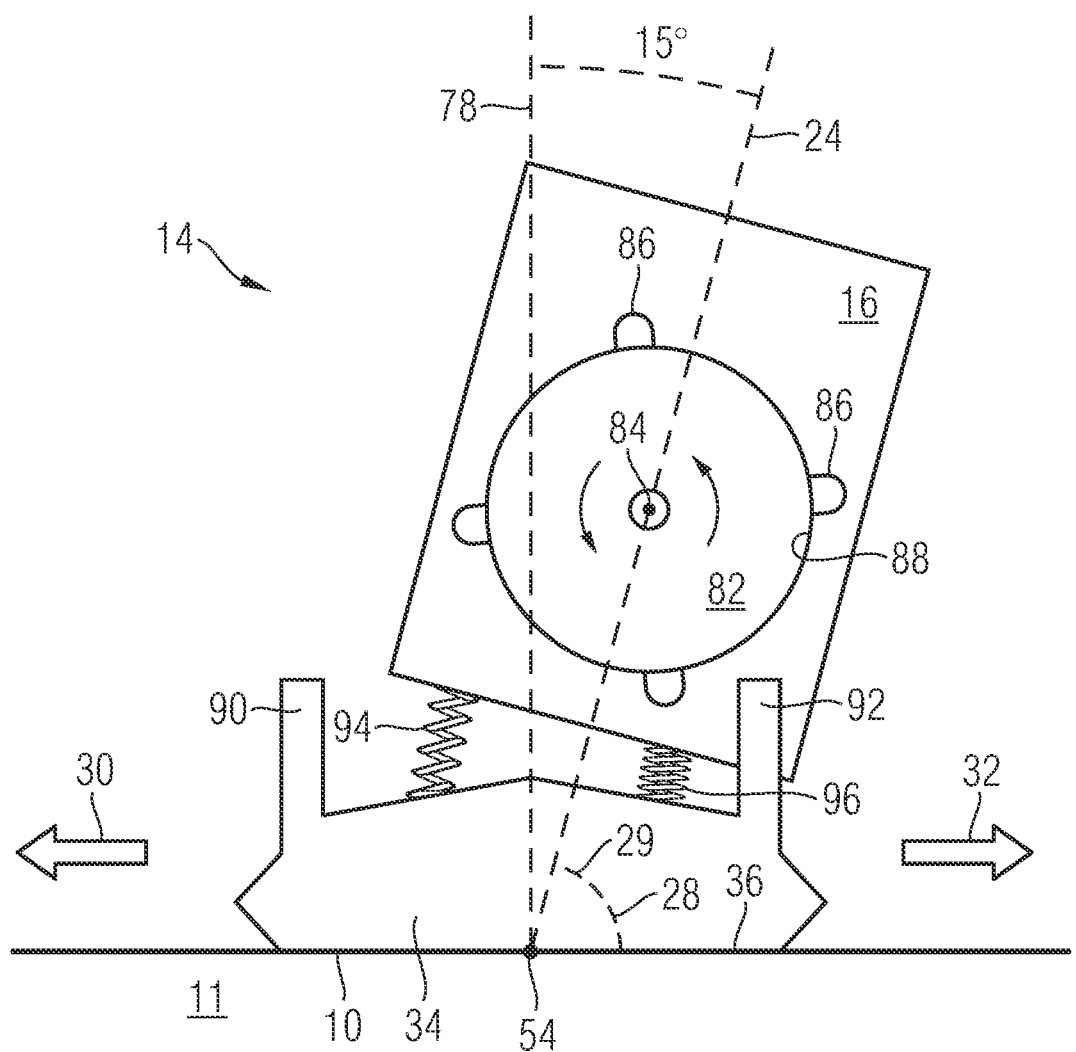
FIG. 19 is a simplified side view of a depilating device according to a second embodiment.

Referring now to FIG. 19, there is illustrated in a schematic and simplified manner a depilating device 14 comprising a pivotable skin contact member 34 for contacting the skin 11, wherein the pivot angle 29 of the skin contact member 34 relative to the longitudinal axis 24 coincides with the application angle 28 when the depilating device 14 is applied to the skin 11, at least as long as the application angle 28 is within an optimal first range or a suboptimal second range. It is recalled that the application angle 28 is the angle between the surface 10 of the skin 11 and the longitudinal axis 24 defined by the body 16. Mounted to the body 16 of the depilating device 14 is an epilation cylinder 82 for driving clamping discs or other hair removing means (not shown). The epilation cylinder 82 is mounted to the body 16 by means of an axle 84 extending parallel to the surface 10 of the skin 11 and perpendicular to the moving directions 30 and 32. Tilting the body 16 relative to the skin 11 is equivalent to pivoting the body 16 about the pivot axis 54, thereby changing the application angle 28. For application angles in the optimal first range of between 75° and 105° the epilation cylinder 82 rotates without contacting the skin contact member 34. However, when the application angle assumes values of about 75° or 105°, the epilation cylinder 82 comes into contact with a rib 90 or a rib 92, respectively, of the skin contact member 34. Arranged on the circumference 88 of the epilation cylinder 82 are regularly spaced protrusions or knobs 86. The rib 90 or the rib 92 contacting the epilation cylinder 82 while the latter is being rotated about the axle 84 creates a rattling sound and induces vibrations of the skin contact member 34, whereby an acoustic and tactile feedback signal is given to the user. The body 16 is coupled to the skin contact member 34 by means of springs 94, 96. This ensures that the pivot angle 29 will automatically return to its equilibrium value of about 90° if no external torque relative to the pivot axis 54 is applied on the body 16, e.g. when the user releases the depilating device 14. In other words, the skin contact member 34 will automatically rotate back to its equilibrium position relative to the body 16 when the depilating device 14 is taken off the skin 11.

Figure 20:
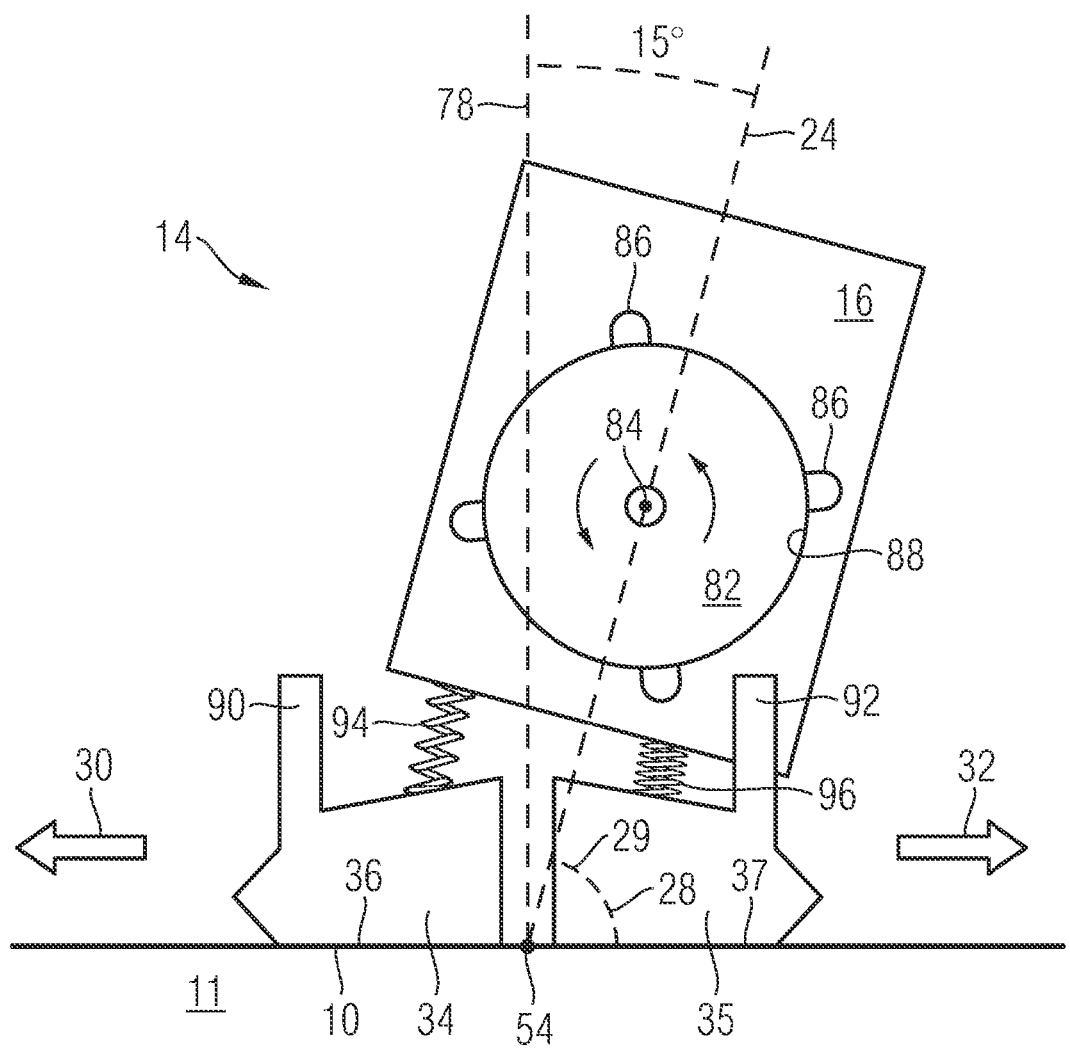
FIG. 20 is a simplified side view of a depilating device according to a third embodiment.

Shown in FIG. 20 is an embodiment similar to the one discussed above with reference to FIG. 15. The depilating device 14 comprises a first skin contact member 34 having a skin contact surface 36, and a second skin contact member 35 having a skin contact surface 37. The first skin contact member 34 and the second skin contact member 35 are mobile relative to each other so that they may adapt themselves, at least to a certain degree, to a curved skin surface 10. The skin contact surface 37 of the second skin contact member 35 defines a second pivot angle 29 relative to the body 16 of the depilating device, while the skin contact surface 36 of the first skin contact member 34 analogously defines a first pivot angle (not indicated) relative to the body 16. A rib 90 of the first skin contact member 34 contacts the epilation cylinder 82 when the first pivot angle deviates from its equilibrium value of 90° by more than about 15°, to create a rattling sound and vibrations of the first skin contact member 34. Similarly, a rib 92 of the second skin contact member 35 contacts the epilation cylinder 82 when the second pivot angle 29 deviates form its equilibrium value of about 90° by more than about 15°, to create a rattling sound and vibrations of the skin contact member 35.

Illustrated in FIGS. 21 to 24 is a depilating device 14 according to a fourth embodiment. The depilating device 14 comprises a body 16 and a depilating member 18 comprising a plurality of rotatable clamping discs. A skin contact member 34 mounted to the body 16 is pivotable about a pivot axis 54. Integrated in the body 16 are an ON/OFF button 98 for starting and stopping a motor (not shown) in the body, and a lamp 100 for emitting either red or green light. The depilating device 14 further comprises an inclination detector (not shown) for measuring the pivot angle 29 between the longitudinal axis 24 of the depilating device 14 and the skin contact member 34. The inclination detector is arranged so as to deliver an electric voltage when the pivot angle 29 is outside a predefined first range (e.g. 75° to 105° and to deliver no voltage when the pivot angle 29 is within the first range. The inclination detector's output is fed to an electronic microcontroller (not shown) coupled to the lamp 100. When the depilating device 14 is ON (its motor running), then as long as the pivot angle 29 is within the first range the lamp 100 emits green light, indicating to the user that the depilating device 14 is being applied to the skin at a good application angle. When the application angle and thus the pivot angle 29 leave the first range, the inclination detector no longer delivers a voltage to the microcontroller. The microcontroller accordingly causes the lamp 100 to emit red light. The lamp's color changing from green to red constitutes an optical feedback signal for the user. The lamp may, for example, comprise a red and a green light-emitting diode (LED), or a bicolor LED.

In a related embodiment, the lamp 100 is a single-color lamp coupled to the skin contact member 34 such that when the pivot angle 29 is in the optimal first range the lamp 100 is off, whereas when the pivot angle 29 is outside the optimal first range the lamp 100 emits light, for example red light. The lamp 100 may in particular be a red LED.

In another related embodiment (not shown), the skin contact member 34 is coupled mechanically to a mechanical slide indicator arranged on the body 16. The slide indicator is advantageously arranged close to the skin contact member 34, as this allows for a particularly simple coupling mechanism between the indicator and the skin contact plate 34. The slide indicator is of the type commonly used for indicating whether a door is locked or unlocked. It comprises a slidable or pivotable indicator plate having a first portion which is red while a second portion is green. The indicator plate is coupled to the skin contact member 34 and the body 16 of the depilating device 14 such that when the pivot angle 29 is in the optimal first range, only the green portion of the indicator plate is visible, the red portion being hidden by the body 16. In contrast, when the pivot angle 29 is outside the optimal first range, only the red portion of the indicator plate is visible. The visible portion changing from green to red (or from red to green) then constitutes an optical feedback signal for the user. Of course, arbitrary color combinations may be used instead of the conventional pair of colors green and red.

Figure 25:
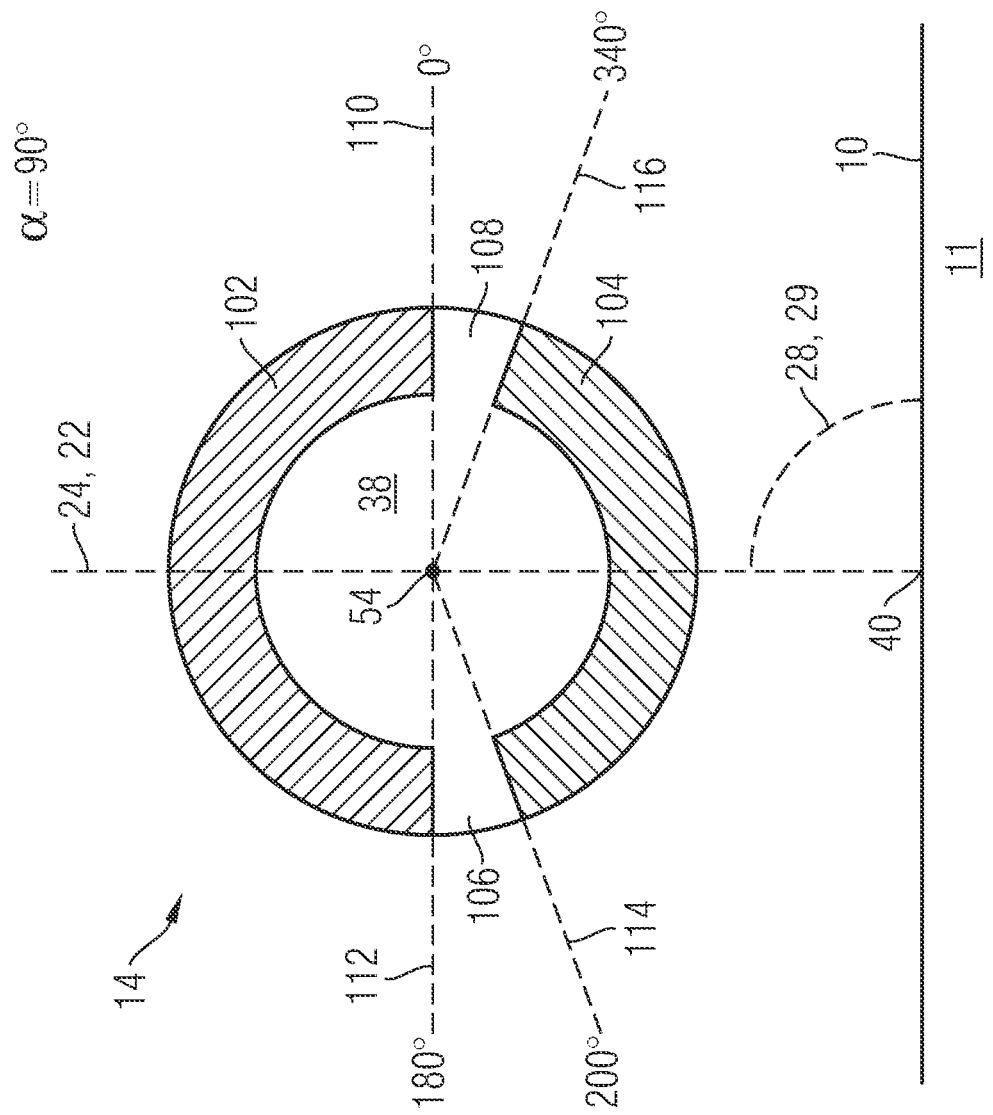
FIG. 25 is a schematic side view of an inclination detector comprising electric contact pads, for an application angle of 90°.
Figure 26:
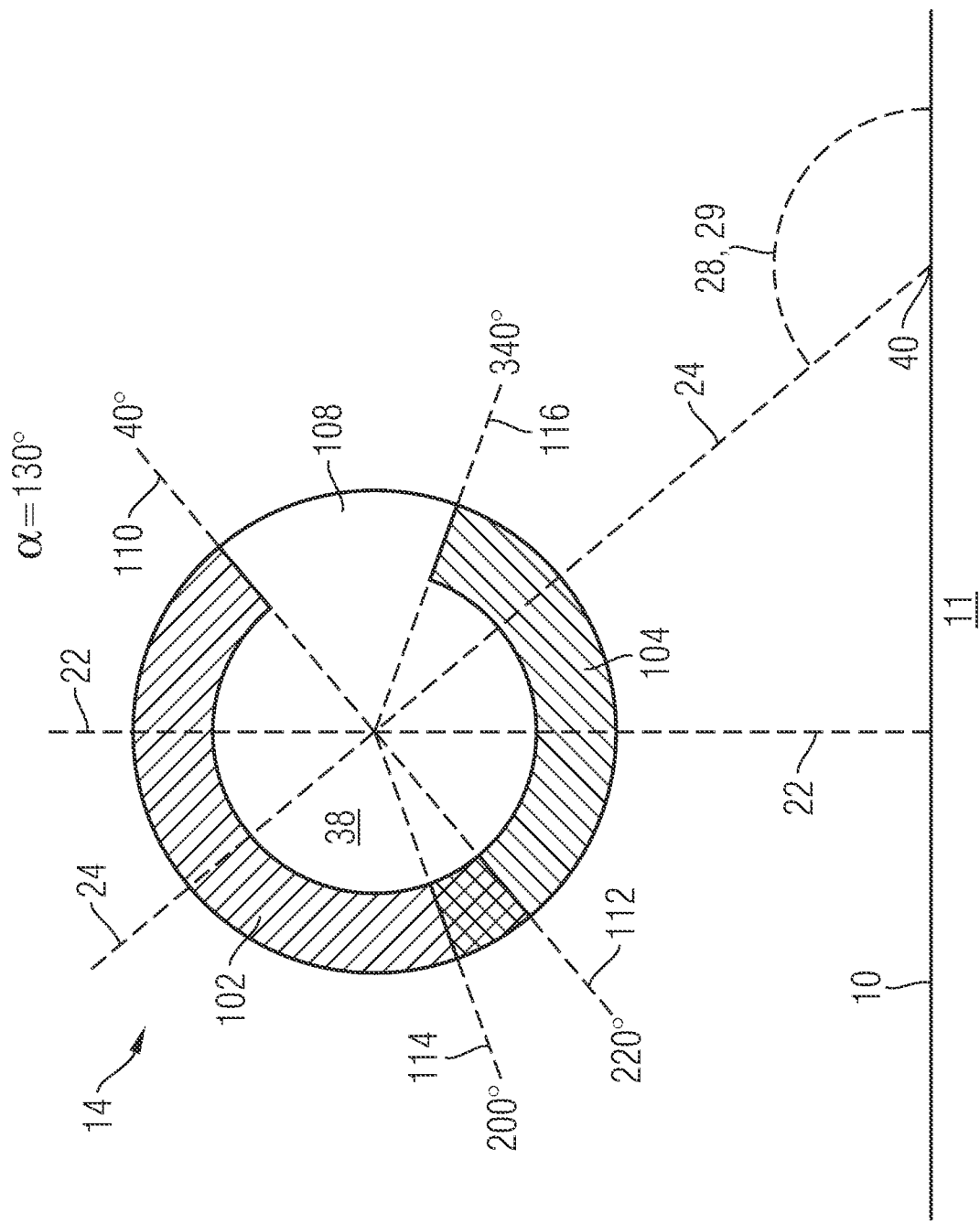
FIG. 26 is a schematic side view of the inclination detector shown in FIG. 33, for an application angle of 130°.

Referring to FIGS. 25 and 26, there is illustrated in a simplified manner a mechanism for generating in a depilating device 14 an electric or electronic signal as a function of the application angle 28. The depilating device 14 comprises a body (not shown) defining a longitudinal axis 24. The depilating device 14 further comprises a pivotable skin contact member (not shown), the skin contact member being of the type discussed above with reference to FIGS. 3 to 5 and defining a pivot angle 29 that is identical to the application angle 28 when the depilating device 14 is applied to the skin 11, provided that the application angle is within an optimal first range or a suboptimal second range. The skin contact member is mounted to the body by means of an axle 38 extending parallel to the pivot axis 54, that is, perpendicular to the plane of the Figures. The axle 38 is rigidly coupled to the body and is coated on its end surface visible in the Figures by a first conductor segment 102 covering the angular range between directions 110 and 112, the directions 110 and 112 being fixed relative to the body and hence to the longitudinal axis 24. The skin contact member comprises a second conductor segment 104 covering the angular range between directions 114 and 116. The position of the first conductor segment 102 relative to the second conductor segment 104 depends on the value of the pivot angle 29 and hence on the application angle 28. As seen in FIG. 25, when the application angle 28 is within a first range, the first conductor segment 102 and the second conductor segment 104 are separated by gaps 106 and 108. When the application angle 28 is outside the first range, as illustrated in an exemplary manner in FIG. 26, the first conductor segment 102 comes to lie below the second conductor segment 104. The conductor segments 102 and 104 are spring-biased toward each other so that they contact each other when they come to lie below each other. The conductor segments 102 and 104 thus contact each other when the application angle 28 is outside the first range. Both conductor segments 102 and 104 form part of an electric or electronic circuit coupled, for example, to a lamp arranged on the body of the depilating device 14 such that when the conductor segments 102 and 104 do not contact each other the lamp emits green light whereas when the conductor segments 102 and 104 contact each other the lamp emits red light.

Figure 27:
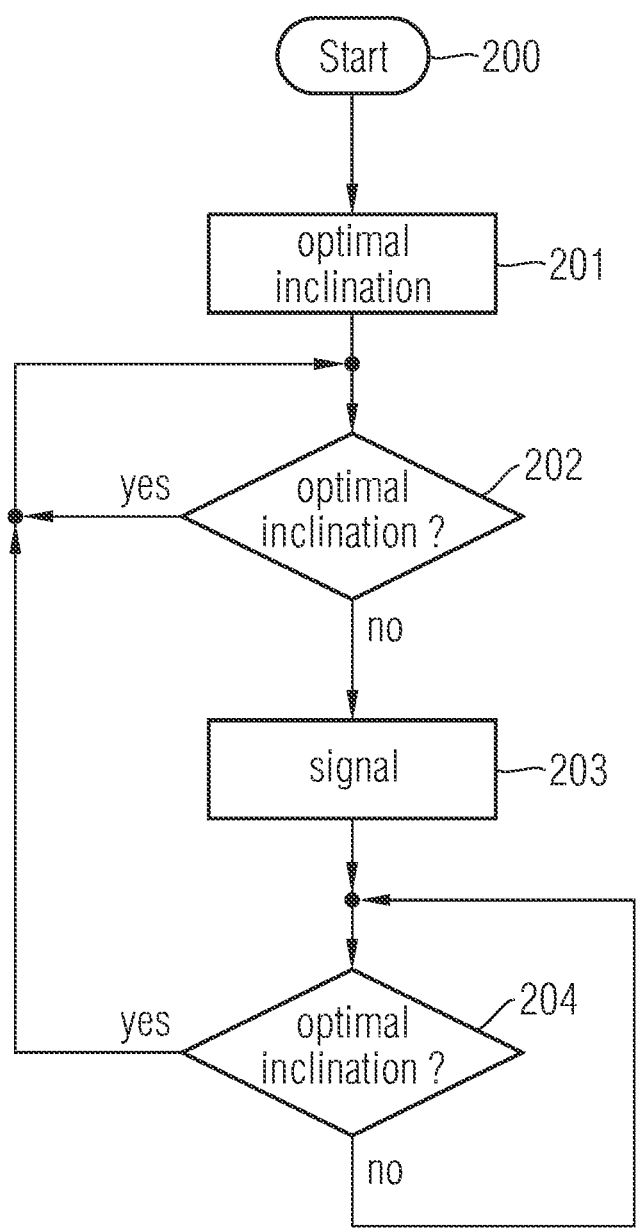
FIG. 27 represents a flow chart illustrating a method of operating a depilating device.

Referring now to FIG. 27, there is represented in a schematic and simplified manner a method of operating a depilating device as described above with reference to FIGS. 1 and 2. The method starts in step 200. In a subsequent step 201 the depilating device is applied to the skin with an application angle belonging to an optimal range of application angles. In a subsequent step 202, it is determined whether the application angle is still in the optimal range. If the application angle is found to be in the optimal range, the process returns to step 202. Otherwise a tactile and/or acoustic and/or optical feedback signal is generated (step 203). In a subsequent step 204, it is again determined whether the application angle is in the optimal range. If the application angle is found to be in the optimal range, the process returns to step 202. Otherwise the process returns to step 204. The process may be terminated at any time, e.g. by removing the depilating device from the skin.

While the invention has been illustrated and described in detail in the drawings and in the foregoing description, the drawings and the description are to be considered exemplary and not restrictive. The invention is not limited to the disclosed embodiments. Equivalents, combinations, and modifications not described above may also be realized without departing from the scope of the invention.

The verb "to comprise" and its derivatives do not exclude the presence of other steps or elements in the matter the "comprise" refers to. The indefinite article "a" or "an" does not exclude a plurality of the subjects the article refers to. It is also noted that a single unit may provide the functions of several means mentioned in the claims. The mere fact that certain features are recited in mutually different dependent claims does not indicate that a combination of these features cannot be used to advantage. Any reference signs in the claims should not be construed as limiting the scope.

The invention claimed is:

1. A depilating device for depilating hair from a surface of a skin, comprising:
    a housing and a depilating member arranged in said housing,
    a skin contact member arranged adjacent to the depilating member and being pivotable relative to the housing about a pivot axis extending parallel to a skin contact surface of the depilating member,
    wherein, in operation, said depilating member has an effective depilating action when positioned within a predetermined range of angular positions relative to the surface of the skin,
    wherein the depilating device further comprises:
        a detector for detecting an actual angular position of the depilating member relative to the surface of the skin, and
        feedback means cooperating with said detector for providing a feedback signal when said actual angular position exceeds said predetermined range of angular positions,
        a coupling member for contacting the depilating member or a driving member when said actual angular position exceeds said predetermined range of angular positions,
    wherein, when said actual angular position is in said predetermined range of angular positions, the skin contact member does not couple to the depilating member or to the driving member via the coupling member,
    wherein, when said actual angular position is outside of said predetermined range of angular positions, the skin contact member couples to the depilating member or to the driving member via the coupling member.

2. A depilating device as claimed in claim 1, wherein the depilating member comprises clamping members which are rotatable relative to the housing about a rotational axis, wherein said predetermined range is associated with an angular effective operating zone of said clamping members relative to said rotational axis.

3. A depilating device as claimed in claim 2, wherein a pivot axis of the skin contact member extends parallel to the rotational axis of the clamping members.

4. A depilating device as claimed in claim 1, wherein the skin contact member is spring-biased to a rest position in which a pivot angle of the skin contact member relative to the skin contact surface is 90°.

5. A depilating device as claimed in claim 1, wherein the feedback means are adapted to provide at least one of the following feedback signals to the user: a tactile feedback signal, an acoustic feedback signal, or an optical feedback signal.

6. A depilating device as claimed in claim 5, wherein for providing an acoustic feedback signal the feedback means comprise an elastic member arranged such that it is elastically deformed when the skin contact member is pivoted.

7. A depilating device as claimed in claim 6, wherein the elastic member is arranged so as to be able to assume a stable or metastable first shape and a stable or metastable second shape, and wherein the shape of the elastic member changes from the first shape to the second shape under production of a clicking sound.

8. A depilating device as claimed in claim wherein the feedback means comprise:
    a spring and
    a carrier coupled to the skin contact member,
the carrier comprising a first bearing and a second bearing such that when said actual angular position is in said predetermined range of angular positions the spring engages with the first bearing and when said actual angular position exceeds said predetermined range of angular positions the spring engages with the second bearing.

9. A depilating device as claimed in claim 8, wherein the spring automatically returns from the second bearing to the first bearing if no external force is exerted on the depilating device.

10. A depilating device as claimed in claim 1, wherein the feedback means comprise circuitry for emitting sound and/or light and/or triggering a tactile signal.

11. A depilating device as claimed in claim 10, wherein the detector comprises circuitry for detecting whether the actual angular position exceeds said predetermined range of angular positions of the depilating member.

12. A depilating device as claimed in claim 11, wherein the detector detects a pivot angle of the skin contact member arranged adjacent to the depilating member and being pivotable relative to the housing about a pivot axis extending parallel to a skin contact surface of the depilating member.

* * * * *